US012165262B1

United States Patent
Petrov et al.

(10) Patent No.: US 12,165,262 B1
(45) Date of Patent: Dec. 10, 2024

(54) REDIRECTED WALKING IN VIRTUAL REALITY ENVIRONMENTS

(71) Applicant: Apple Inc., Cupertino, CA (US)

(72) Inventors: Yury A. Petrov, Cupertino, CA (US); Julius G. Krumbiegel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 17/485,247

(22) Filed: Sep. 24, 2021

Related U.S. Application Data

(63) Continuation of application No. 16/017,696, filed on Jun. 25, 2018, now Pat. No. 11,158,126.

(Continued)

(51) Int. Cl.
*G06T 19/00* (2011.01)
*G02B 27/01* (2006.01)
*G06F 3/01* (2006.01)

(52) U.S. Cl.
CPC .......... *G06T 19/003* (2013.01); *G02B 27/017* (2013.01); *G06F 3/013* (2013.01);
(Continued)

(58) Field of Classification Search
CPC .............. G02B 27/0093; G02B 27/017; G02B 2027/0138; G02B 2027/014;
(Continued)

(56) References Cited

U.S. PATENT DOCUMENTS 9,245,501 B2   1/2016 Liu et al.
9,600,067 B2   3/2017 Kumar et al.
(Continued)

FOREIGN PATENT DOCUMENTS

CN   206058525 U  *  3/2017

OTHER PUBLICATIONS

Dcosta, Utilizing the Redirected Walking Algorithm to Avoid User-Obstacle Collisions, Jul. 2016, Retrieved from the University of Minnesota Digital Conservancy, https://hdl.handle.net/11299/182150 (Year: 2016).*

(Continued)

*Primary Examiner* — Stacy Khoo
(74) *Attorney, Agent, or Firm* — Robert C. Kowert; Kowert, Hood, Munyon, Rankin & Goetzel, P.C.

(57) ABSTRACT

Redirected walking methods are described that may be implemented in virtual reality (VR) systems for guiding or redirecting users' movements within constrained physical environments or in unconstrained physical environments, while the users perceive that they are freely moving about within virtual worlds provided by the VR systems. The methods may involve rendering views of a VR world based at least in part on a user's movements in the real environment, adjusting the views according to the user's position and movements with respect to objects in and boundaries of the real environment, and displaying the adjusted views to the user. In response to visual cues introduced by the methods, the user may adjust their path in the real world environment. For example, a rotation of the VR environment introduced by a shift of one or more views may cause the user to turn in a direction opposite to the rotation.

20 Claims, 21 Drawing Sheets

Related U.S. Application Data

(60) Provisional application No. 62/527,910, filed on Jun. 30, 2017.

(52) U.S. Cl.
CPC ............. *G02B 2027/0138* (2013.01); *G02B 2027/014* (2013.01); *G06F 2203/012* (2013.01)

(58) Field of Classification Search
CPC . G02B 2027/0187; G06F 3/011; G06F 3/012; G06F 3/013; G06F 2203/012; G06T 19/003
See application file for complete search history.

(56) References Cited

U.S. PATENT DOCUMENTS

| | | |
|---|---|---|
| 2008/0211771 A1 | 9/2008 | Richardson |
| 2014/0146075 A1 | 5/2014 | Takasu |
| 2015/0092015 A1 | 4/2015 | Stafford |
| 2016/0033768 A1 | 2/2016 | Pedrotti et al. |
| 2017/0123747 A1* | 5/2017 | Rochford .............. G06F 3/1423 |
| 2017/0139474 A1 | 5/2017 | Rochford et al. |
| 2017/0178408 A1 | 6/2017 | Bavor, Jr. et al. |
| 2017/0221264 A1 | 8/2017 | Perry |
| 2019/0251622 A1 | 8/2019 | Wiedmeyer et al. |

OTHER PUBLICATIONS

Peck et al., "The Design and Evaluation of a Large-Scale Real-Walking Locomotion Interface", IEEE Transactions on Visualization and Computer Graphics, vol. 18, No. 7, Jul. 2012, pp. 1053-1067.

Kunz et al., "Real walking in virtual environments for factory planning and evaluation", Procedia CIRP, vol. 44, 2016, pp. 257-262.

Jerald et al., "Relating Scene-Motion Thresholds to Latency Thresholds for Head-Mounted Displays", Proceedings of IEEE Virtual Real Conference 2009, pp. 211-218.

Field, et al., "Generalised Algorithms for Redirected Walking in Virtual Environments", paper presented at the AISAT2004: International Conference on Artificial Intelligence in Science and Technology, Nov. 21-25, 2004, pp. 1-6.

Sarah Zhang, You Can't Walk in a Straight Line—and That's Great for VR, 2015, Https://www.wired.com/2015/08/cant-walk-straight-lineand-thats-great-vr/, pp. 1-5.

\* cited by examiner

REDIRECTED WALKING IN VIRTUAL REALITY ENVIRONMENTS

PRIORITY INFORMATION

This application is a continuation of U.S. patent application Ser. No. 16/017,696, filed Jun. 25, 2018, which claims benefit of priority to U.S. Provisional Application Ser. No. 62/527,910, filed Jun. 30, 2017, and which are incorporated herein by reference in their entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world, or alternatively combines virtual representations of real world objects with views of a three-dimensional (3D) virtual world. The simulated environments of virtual reality and/or the mixed environments of mixed reality may thus be utilized to provide an interactive user experience for multiple applications, such as applications that add virtual content to a real-time view of the viewer's environment, applications that generate 3D virtual worlds, interacting with virtual training environments, gaming, remotely controlling drones or other mechanical systems, viewing digital media content, interacting with the Internet, exploring virtual landscapes or environments, or the like.

SUMMARY

Various embodiments of methods and apparatus for providing redirected walking in three-dimensional (3D) virtual reality (VR) environments provided by VR applications executing on VR systems are described. Embodiments of redirected walking methods are described that may be implemented by VR applications executing on VR systems for guiding or redirecting users' movements within constrained physical environments such as rooms, gyms, yards, or fields, or in unconstrained physical environments, while the users perceive that they are freely moving about within the virtual worlds provided by the VR applications and systems. The redirected walking methods may generally involve rendering views of a VR world based on a user's movements in the real environment, adjusting the views (e.g., by slightly shifting each view to subtly rotate the VR world) according to the user's position and movements with respect to objects in and boundaries of the real environment, and displaying the adjusted views to the user. In response to visual cues introduced to the views by the redirected walking methods, the user may adjust their path in the real world environment. For example, a rotation of the VR environment introduced by a shift of one or more VR views may cause the user to turn in a direction opposite to the rotation.

The redirected walking methods may introduce a deliberate mismatch in the mapping of virtual to real space geometry; the mismatch may cause the user to adjust their real world path or orientation to achieve a desired virtual path or orientation. This mismatch may be algorithmically determined to optimally use the provided real space in the exploration of the virtual space.

The redirected walking methods may include a method in which a subtle visual yaw rotation of the VR world is introduced while the user is walking straight in the VR world, for example along a straight path. This rotation of the VR world may cause the user to subconsciously correct their physical motion path in the direction opposite to the VR world rotation in order to keep walking straight (e.g., stay on the straight path) in the VR world. This rotation technique may, for example, allow the VR application and system to steer the user around a circle, for example a circle with a six meter or greater radius, without the user realizing it. To the user, it may appear that they are walking straight on a straight path in the virtual world, while in the physical world they are actually walking in a circle.

The redirected walking methods may also include a method in which the rate of turns that the user makes in the VR environment are decreased or increased. By decreasing the apparent rate of a turn visible in the VR world, the user is manipulated to compensate with a steeper turn in the real world. Decreases of up to 20% of the rotational rate and increases of up to 70% of the rotational rate may remain unnoticed by users.

The redirected walking methods may also include a method in which the VR world is rotated around the user during blinks. The HMD may include eye tracking sensors that the VR system may use to detect blinks. On average, blinks happen about 10 times per minute. Assuming that a 2 degree yaw rotation of the VR world goes undetected during a blink, the user may be rotated at a rate of 20 degrees per minute when the user is not moving by subtly rotating the VR world by up to 2 degrees when each blink is detected.

The redirected walking methods may also include a method in which the rate of rotation of the VR world is changed during head rotations without the user necessarily physically moving anywhere. For example, if the VR system detects via motion sensors of the HMD that the user is turning their head to the left or right, the rate at which the VR view turns may be slightly increased while the head is turning away (e.g., up to 2 degrees/second) and slightly decreased while the head is turning back (e.g., up to 1 degree/second). Note that, in some embodiments, in some cases the head motion may be slightly decreased while the head is turning away (e.g., up to 1 degrees/second) and slightly increased while the head is turning back (e.g., up to 2 degree/second). Changing the rate of rotation of the VR world as the head is rotated in the user's view of the VR world being somewhat rotated (e.g. up to 5 degrees) during the head turn, which may cause the user to compensate by reorienting themselves in the physical world to face in the correct direction in the virtual world.

The redirected walking methods may also include a method in which the VR world is subtly rotated around the user while the user is standing still, which may cause the user to compensate in the physical world in the opposite direction of the rotation to reorient themselves in the virtual world.

The redirected walking methods may also include a method in which the apparent rate of forward motion in the VR world is increased by up to 30% to create an illusion of a larger space.

The redirected walking methods may also include a method in which the VR world is slightly translated while the user is standing still or moving, for example to help offset translations introduced during over-rotation or under-rotation.

Figure 1:
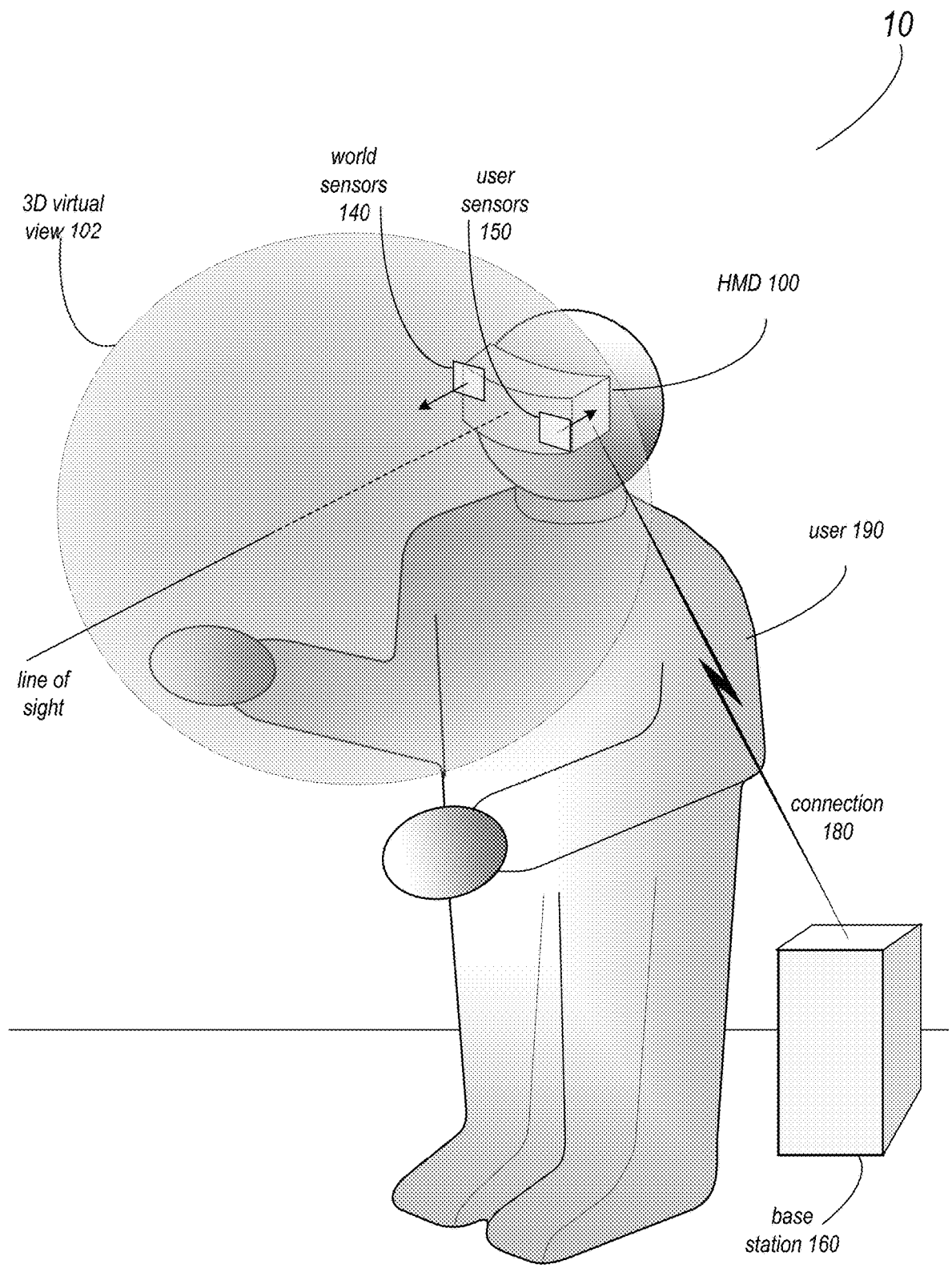
FIG. 1 illustrates a virtual reality system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing redirected walking in three-dimensional (3D) virtual reality (VR) environments provided by VR applications executing on VR systems are described. Embodiments of VR systems are described that include HMDs that are not physically tethered to stationary base stations and that include sensor technology for detecting physical objects and surfaces in physical environments, and thus allow users freedom of movement within physical environments. In addition, methods, referred to as redirected walking methods, are described that may be implemented by VR applications executing on the VR systems for guiding or redirecting users' movements within constrained physical environments such as rooms, gyms, yards, or fields, or even in unconstrained physical environments, while the users perceive that they are freely moving about within the 3D virtual worlds provided by the VR applications and systems. The redirected walking methods may provide subtle visual cues to a user via the HMID that may cause the user to adjust their path or direction within the physical environment while they are traveling a path or direction in the virtual world provided by the VR application and system. The redirected walking methods may introduce a deliberate mismatch in the mapping of virtual to real space geometry; the mismatch may cause the user to adjust their real world path or orientation to achieve a desired virtual path or orientation. This mismatch may be algorithmically determined, for example using an adjusting algorithm as described later in this document, to optimally use the provided real space in the exploration of the virtual space. For example, in the virtual world, it may appear to the user that they are walking along a straight path, while in the physical world the redirected walking methods are subtly causing the user to walk in a curved or circular path. By applying the redirected walking methods, the user's movements in the physical world may be constrained within a physical environment such as a room, gym, or yard, while the user is experiencing unconstrained movement within a virtual world provided by the VR application and system.

VR applications may allow users to visually move about within the VR worlds provided by the applications through the VR systems. However, conventional VR systems are typically tethered to base stations, and thus do not allow users freedom to move about within the real world. Without accompanying real motion in the real world environment, the visual-only movement provided by conventional VR systems often causes discomfort to the users, with symptoms similar to motion sickness. The symptoms may last for hours or even days after an immersive VR experience. Conventionally, this discomfort, referred to as simulator sickness, can only be mitigated by physically moving the user in the physical environment. For example, some physical motion can be achieved by tilting, jerking, and rotating the user using special hardware referred to as a motion platform. However, this solution is expensive, bulky, and usually does not completely remove the simulator sickness symptoms. An alternative solution to simulator sickness is to let a user move around on their own while reproducing their real world movement visually in the VR environment. Because the user is typically confined within a physical space (living room, backyard, gym, etc.) the VR motion is also confined to the same VR space. However, due to a lack of precision in human perception, the VR motion can be subtly manipulated using visual techniques to guide the user around the confined space while creating an illusion of walking in an unbounded VR world. These visual techniques may be referred to as redirected walking techniques or methods.

Embodiments of VR systems are described that allow the user freedom of movement within a physical environment. An embodiment of a VR system may include a headset, helmet, goggles, or glasses worn by the user, referred to herein as a head-mounted display (HMD), and may also include a separate computing device, referred to herein as a base station. The HMD may include world sensors that collect information about the user's environment (e.g., video, depth information, lighting information, etc.), and user sensors that collect information about the user (e.g., the user's expressions, eye movement, head movement, hand gestures, etc.). The information collected by the sensors may be transmitted to the base station via a wired or wireless connection. The base station may include software and hardware (e.g., processors (system on a chip (SOC), CPUs, image signal processors (ISPs), graphics processing units (GPUs), coder/decoders (codecs), etc.), memory, etc.) configured to generate virtual content and render frames based at least in part on the sensor information received from the HMD via the connection and to transmit the rendered frames to the HMD for display via the connection. The HMD displays the frames to provide views of a virtual world to the user as the user moves about in the real world environment. The sensor information collected by the HMD may be used to determine the position and motion of the user as the user moves about in the real world environment, and this information may be used to reproduce their real world movement visually in the VR environment. The determined information about the user's position may include the user's current location within the real world environment as well as the current orientation of the user's head with respect to the environment (i.e., in which direction the user is currently looking). The determined information about the user's motion may include direction (i.e., in which direction the user is walking and/or in which direction the user's head is turning) and velocity (i.e., how fast the user is walking and/or how fast the user's head is turning) components.

In some embodiments, the HMD and base station may each include wireless communications technology that allows the HMD and base station to communicate and exchange data via a wireless connection. The wireless connection between the HMD and the base station does not tether the HMD to the base station as in conventional tethered systems and thus allows users freedom of movement in the physical environment. In addition, in some embodiments the base station may implement wireless communications technology that allows two or more HMDs to communicate with the base station and VR software that supports multiple simultaneous VR sessions to thus allow multiple users to simultaneously participate in a VR session and experience a VR world in the same physical environment. However, wired connections may be used in some embodiments. For example, in some embodiments the base station may be carried by the user or carried in a backpack by the user to thus allow the user freedom of movement in the physical environment, and may be connected to the HMD by a wired (or wireless) connection.

While embodiments of a VR system are generally described that include an HMD and a base station, in some embodiments, the functionality of a base station as described herein may be integrated into the HMD. In these embodiments, the HMID may include software and hardware (e.g., processors (system on a chip (SOC), CPUs, image signal processors (ISPs), graphics processing units (GPUs), coder/decoders (codecs), etc.), memory, etc.) configured to generate virtual content and render frames based at least in part on the sensor information received from the sensors of the HMID and provide the rendered frames to a display subsystem of the HMD for display.

Embodiments of redirected walking methods are described that may be implemented by VR applications executing on the VR systems for guiding or redirecting users' movements within constrained physical environments such as rooms, gyms, yards, or fields, or in unconstrained physical environments, while the users perceive that they are freely moving about within the virtual worlds provided by the VR applications and systems. The redirected walking methods may generally involve rendering views of a VR world based on a user's movements in the real environment, adjusting the views (e.g., by slightly shifting each view to subtly rotate the VR world) according to the user's position and movements with respect to objects in and boundaries of the real environment, and displaying the adjusted views to the user. In response to visual cues introduced to the views by the redirected walking methods, the user may adjust their path in the real world environment. For example, a rotation of the VR environment introduced by a shift of one or more VR views may cause the user to turn in a direction opposite to the rotation.

The redirected walking methods may include a method in which the VR application and system introduces a subtle visual yaw rotation of the VR world while the user is walking straight in the VR world, for example along a straight path. This rotation of the VR world may cause the user to subconsciously correct their physical motion path in the direction opposite to the VR world rotation in order to keep walking straight (e.g., stay on the straight path) in the VR world. This rotation technique may, for example, allow the VR application and system to steer the user around a circle, for example a circle with a six meter or greater radius, without the user realizing it. To the user, it may appear that they are walking straight on a straight path in the virtual world, while in the physical world they are actually walking in a circle.

The redirected walking methods may also include a method in which the VR application and system decrease or increase the rate of turns that the user makes in the VR environment. By decreasing the apparent rate of a turn visible in the VR world, the user is manipulated to compensate with a steeper turn in the real world. Decreases of up to 20% of the rotational rate and increases of up to 70% of the rotational rate may remain unnoticed by users.

The redirected walking methods may also include a method in which the VR application and system subtly rotate the VR world around the user during blinks. The HMD may include eye tracking sensors that the VR system may use to detect blinks. On average, blinks happen about 10 times per minute. Assuming that a 2 degree yaw rotation of the VR world goes undetected during a blink, the user may be rotated at a rate of 20 degrees per minute when the user is not moving by subtly rotating the VR world by up to 2 degrees when each blink is detected.

The redirected walking methods may also include a method in which the VR application and system change the rate at which the VR view is rotated during head rotations without the user necessarily physically moving anywhere. For example, if the VR system detects via motion sensors of the HMD that the user is turning their head to the left or right, the rate at which the VR view turns may be slightly increased while the head is turning away (e.g., up to 2 degrees/second) and slightly decreased while the head is turning back (e.g., up to 1 degree/second). Note that, in some embodiments, in some cases the head motion may be slightly decreased while the head is turning away (e.g., up to 1 degrees/second) and slightly increased while the head is turning back (e.g., up to 2 degree/second). Changing the rate of rotation of the VR world as the head is rotated in the user's view of the VR world being somewhat rotated (e.g. up to 5 degrees) during the head turn, which may cause the user to compensate by reorienting themselves in the physical world to face in the correct direction in the virtual world.

The redirected walking methods may also include a method in which the VR application and system imperceptibly rotate the VR world around the user continuously while the user is standing still, which may cause the user to compensate in the physical world in the opposite direction of the rotation to reorient themselves in the virtual world.

The redirected walking methods may also include a method in which the VR application and system increase the apparent rate of forward motion in the VR world, for example by up to 30%, to create an illusion of a larger space.

The redirected walking methods may also include a method in which the VR world is slightly translated while the user is standing still or moving, for example to help offset translations introduced during over- or under-rotation.

The redirected walking methods may, for example, be implemented as software modules or functions in VR applications that execute on the VR systems. Alternatively, the redirected walking methods may be implemented as plug-in modules or libraries that may be added to or compiled into VR applications. As another alternative, the redirected walking methods may be implemented by software and/or hardware of the base station and may be applied by the base station controller to VR content generated by VR applications executing on the base station when rendering VR frames for display.

The HMID may include world sensors (e.g., scene cameras, depth/range sensors, etc.) that the VR system may use to detect stationary or moving objects (e.g., furniture, people, etc.) and surfaces (e.g., walls) in the real world environment as the user is moving about to explore the VR world. In some embodiments, the VR application and system may perform a hard reset of the user's VR position or orientation if the user is in danger of a collision with a detected object or surface. In some embodiments, virtual representations of real-world objects or surfaces may be displayed to the user in the VR view as they move about.

The redirected walking methods may, for example, be implemented in the following virtual reality scenarios that may be implemented by VR applications and systems. The scenarios differ in the complexity of the paths that the user is allowed to travel in the respective VR worlds.

A first VR scenario in which the redirected walking methods may be implemented is a scenario in which the user walks a predetermined path in a VR environment. In this scenario, the user follows a route through a VR environment defined by a visible path, signs, hallways, opened doors, obstacles, and so on. In this scenario, the redirected walking methods may be defined in advance according to the known turns of the route that the user may encounter and the physical layout of the physical environment. Local variations of the route may be allowed; for example, the path may split or fork around an obstacle.

A second VR scenario in which the redirected walking methods may be implemented is a scenario that provides predetermined paths with some freedom of choice. In this scenario, the user may be restricted to several routes, with occasional forks, passages, and the like that allow the user to select between different routes or paths. In this scenario, the redirected walking methods may be applied while the user is walking a route in advance of the user reaching decision points (i.e., forks in the path). The user's choices are limited to several forks, and the user's approach to these potentially problematic decision spots may be prepared in advance by guiding the user using the redirected walking methods to points in the physical space that may allow the most freedom of movement and maneuvering if the user decides to change their route (e.g., turn left or right) at these points.

A third VR scenario in which the redirected walking methods may be implemented is a free roaming scenario in which the user is free to move in any direction; there are no predefined routes for the user to follow, although there may be virtual objects that the user has to avoid or walk around, or that the user can explore. In this scenario, most or all of the redirected walking methods may be employed to guide the user's movements in the physical environment as the user explores the virtual world. For this scenario, since there are no predefined paths that the user must follow, the VR application and system may implement algorithms that determine redirected walking adjustments in real time based at least in part on world sensor information collected by the HMD to adjust the user's path in the physical environment as the user explores the virtual world.

Figure 2:
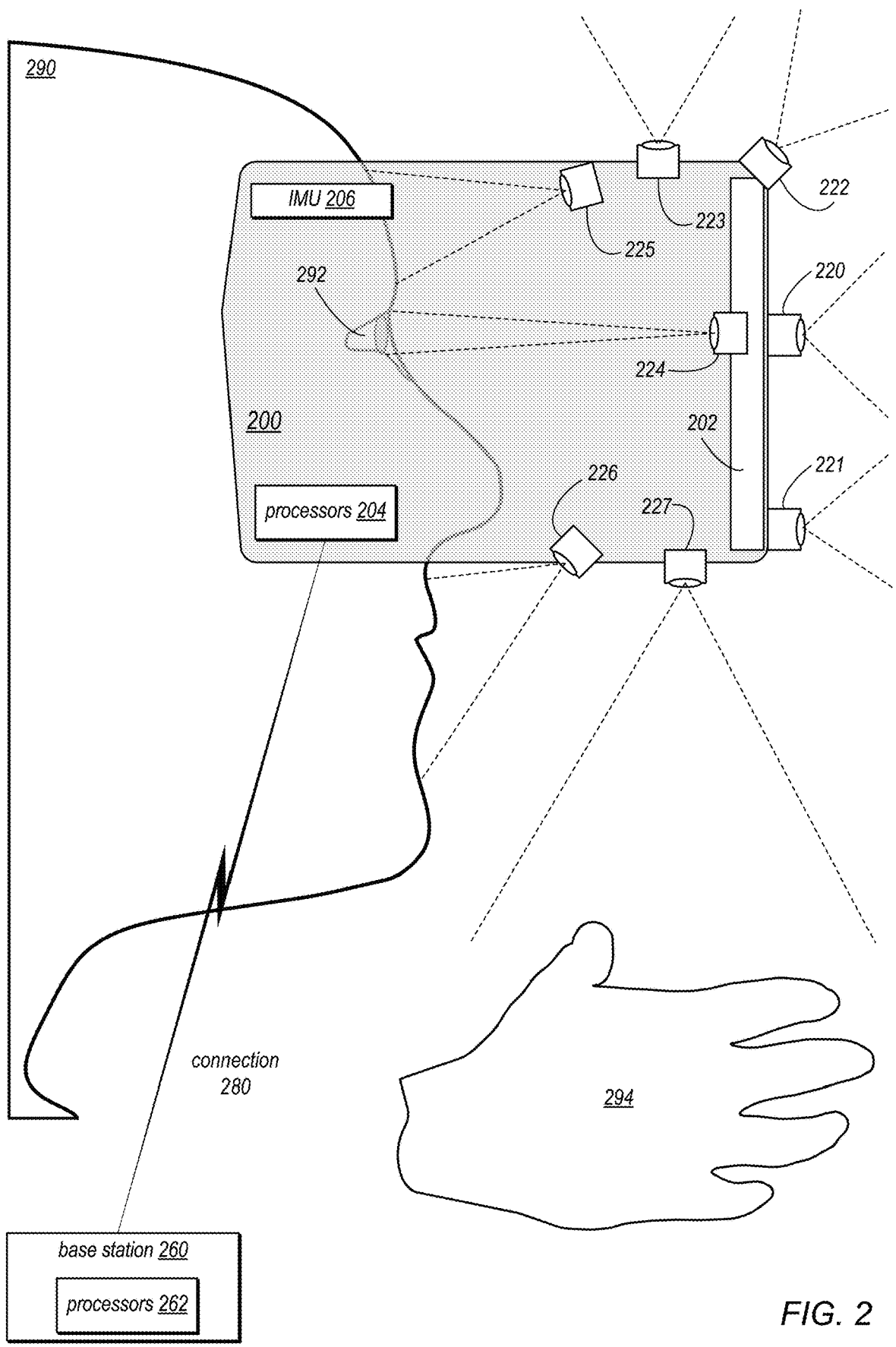
FIG. 2 illustrates world-facing and user-facing sensors of a head-mounted display (HMD) in a virtual reality system as illustrated in FIG. 1, according to some embodiments.
Figure 3:
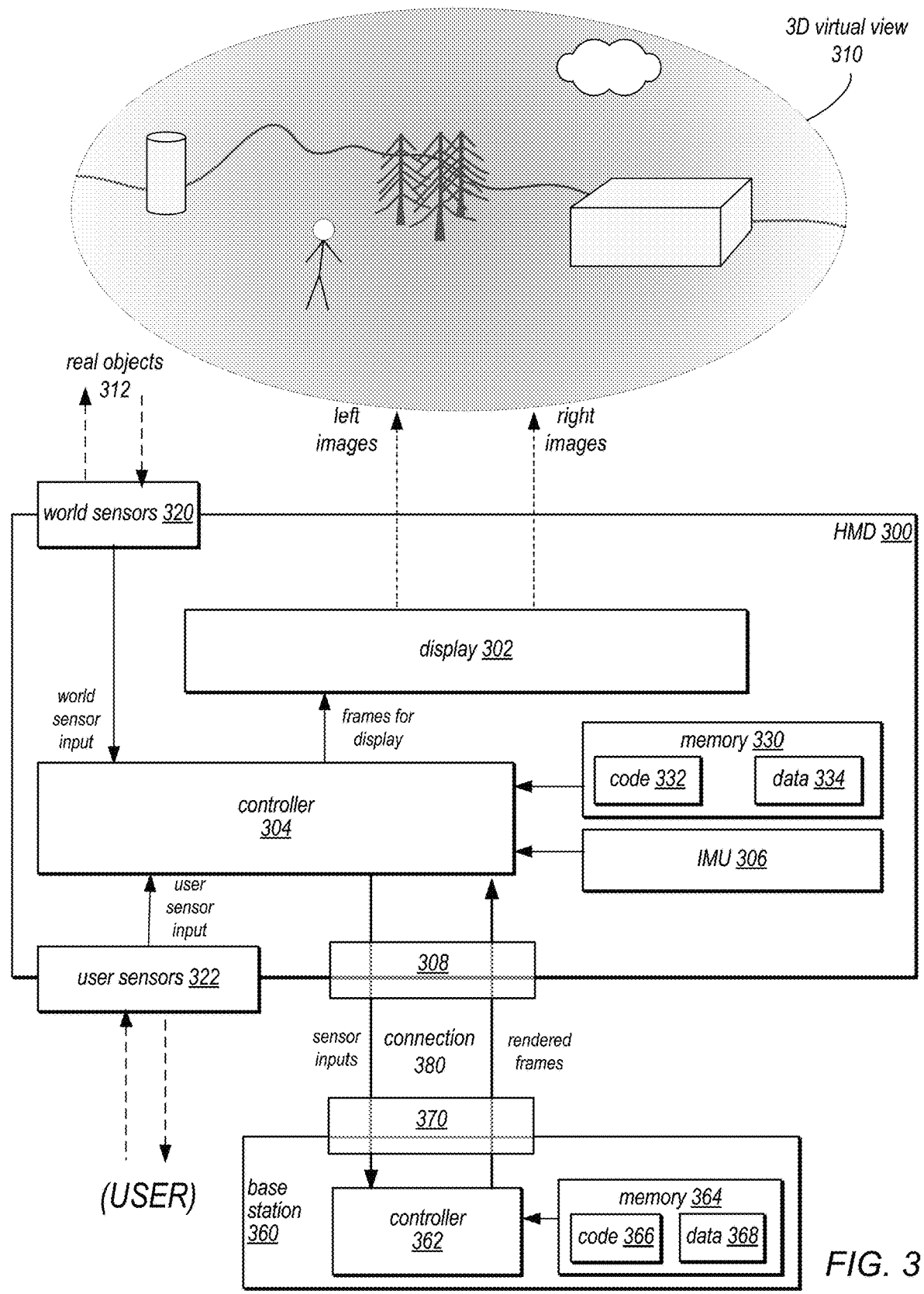
FIG. 3 is a block diagram illustrating components of a virtual reality system as illustrated in FIG. 1, according to some embodiments.

FIGS. 1 through 3 illustrate embodiments of an example virtual reality system that may implement embodiments of the redirected walking methods as described herein.

FIG. 1 illustrates a virtual reality system 10, according to at least some embodiments. In some embodiments, a virtual reality system 10 may include a HMD 100 such as a headset, helmet, goggles, or glasses that may be worn by a user 190, and a base station 160 configured to render VR frames for display by the HMD 100. In some embodiments, the HMD 100 and base station 160 may each include wireless communications technology that allows the UMD 100 and base station 160 to communicate and exchange data via a connection 180. However, in some embodiments, a wired connection between the UMD 100 and base station 160 may be used.

The HMD 100 may include world sensors 140 that collect information about the user 190's environment (video, depth information, lighting information, etc.), and user sensors 150 that collect information about the user 190 (e.g., the user's expressions, eye movement, gaze direction, hand gestures, etc.). Example sensors 140 and 150 are shown in FIG. 2. The UMD 100 may transmit at least some of the information collected by sensors 140 and 150 to a base station 160 of the virtual reality system 10 via connection 180. The base station 160 may render VR frames based at least in part on the various information obtained from the sensors 140 and 150, compress the frames, and transmit the frames to the HMD 100 via the connection 180 for display to the user 190. The frames may be displayed by the HMD 100 to the user 190 to provide a 3D virtual view 102; different virtual objects, surfaces, etc. may be displayed at different depths in the virtual view 102. In some embodiments, virtual representations of real-world objects detected by the world sensors 140 may be overlaid on or composited in the virtual view 102 provided by the HMD 100.

HMD 100 may include a display subsystem (also referred to herein as a "display") that implements any of various types of virtual reality display technologies. For example, HMD 100 may include a near-eye VR display system that displays left and right images on screens in front of the user 190's eyes that are viewed by a subject, such as DLP (digital light processing), LCD (liquid crystal display) and LCoS (liquid crystal on silicon) technology VR display systems. As another example, HMD 100 may include a direct retinal projector system that scans left and right images, pixel by pixel, to the subject's eyes. To scan the images, left and right projectors generate beams that are directed to left and right display screens (e.g., ellipsoid mirrors) located in front of the user 190's eyes; the display screens reflect the beams to the user's eyes. To create a three-dimensional (3D) effect, virtual content at different depths or distances in the 3D virtual view 102 are shifted left or right in the two images as a function of the triangulation of distance, with nearer objects shifted more than more distant objects.

While not shown in FIG. 1, in some embodiments the virtual reality system 10 may include one or more other components. For example, the system may include a controller that may be held by the user 190 that allows the user to interact with virtual content in the 3D virtual view 102, or to otherwise control the VR experience.

While FIG. 1 shows a single user 190 and HMD 100, in some embodiments the virtual reality system 10 may support multiple HMDs 100 communicating with the base station 160 at the same time to thus enable multiple users 190 to use the system at the same time in a co-located physical environment.

While FIG. 1 shows the base station 160 located separately from the user 190, in some embodiments the base station 160 may be a portable device that can be carried by the user 190, for example in a backpack. Further, in some embodiments, functionality of the base station 160 may be integrated into the HMID 100.

FIG. 2 illustrates world-facing and user-facing sensors of an example HMD 200, according to at least some embodiments. FIG. 2 shows a side view of an example HMD 200 with world and user sensors 220-227, according to some embodiments. Note that HMD 200 as illustrated in FIG. 2 is given by way of example, and is not intended to be limiting. In various embodiments, the shape, size, and other features of a UMD may differ, and the locations, numbers, types, and other features of the world and user sensors may vary.

As shown in FIG. 2, HMD 200 may be worn on a user 290's head so that the displays 202 (e.g. screens and optics of a near-eye VR display system, or reflective components (e.g., ellipsoid mirrors) of a direct retinal projector system) are disposed in front of the user 290's eyes 292. In some embodiments, a HMD 200 may include world sensors 220-223 that collect information about the user 290's environment (video, depth information, lighting information, etc.), and user sensors 224-227 that collect information about the user 290 (e.g., the user's expressions, eye movement, hand gestures, etc.). The HMD 200 may include one or more of various types of processors 204 (system on a chip (SOC), CPUs, image signal processors (ISPs), graphics processing units (GPUs), coder/decoders (codecs), etc.) that may, for example perform initial processing (e.g., encoding/compression) of the information collected by the sensors 220-227 and transmit the information to a base station 260 of the virtual reality system via a connection 280, and that may also perform processing (e.g., decoding/decompression, compositing, etc.) of frames received from the base station 260 and provide the processed frames to the display subsystem for display.

In some embodiments, the connection 280 may be implemented according to a proprietary wireless communications technology (e.g., 60 gigahertz (GHz) wireless technology) that provides a highly directional wireless link between the HMID 200 and the base station 260. However, other commercial (e.g., Wi-Fi, Bluetooth, etc.) or proprietary wireless communications technologies may be used in some embodiments. In some embodiments, a wired connection between the HMD 200 and base station 260 may be used.

The base station 260 may be an external device (e.g., a computing system, game console, etc.) that is communicatively coupled to HMD 200 via the connection 280. The base station 260 may include one or more of various types of processors 262 (e.g., SOCs, CPUs, ISPs, GPUs, codecs, and/or other components) and memory configured to store software (e.g., one or more VR applications) that is executable by the processors 262, as well as data that may be used by the software when executing on the base station 260. The base station 260 may execute a VR application that is configured to provide a VR experience in a virtual world to the user 290. During execution of the VR application, the base station 260 may render frames (each frame including a left and right image) of virtual content for the VR experience. One or more of the redirected walking methods as described herein may be applied during the rendering based at least in part on the various inputs obtained from the sensors 220-227 via the connection 280. The base station 260 may encode/compress the rendered frames, and transmit the compressed frames to the HMD 200 for processing and display to the left and right displays 202 to thus provide a VR view of the virtual world to the user 290. FIG. 3 further illustrates components and operations of a HMD 200 and base station 260 of a virtual reality system, according to some embodiments.

World sensors 220-223 may, for example, be located on external surfaces of a HMD 200, and may collect various information about the user's physical (or real) environment. In some embodiments, the information collected by the world sensors may be used to detect objects and surfaces in the real environment. In some embodiments, the world sensors may be used to provide depth information for objects and surfaces in the real environment. In some embodiments, the world sensors may be used to provide position (e.g., location and orientation) and motion (e.g., direction and velocity) information for the user in the real environment.

In some embodiments, the world sensors may include one or more scene cameras 220 (e.g., RGB (visible light) video cameras) that capture video of the user's environment that may be used to provide the base station 260 with a virtual view of the real environment. In some embodiments, video streams captured by cameras 220 may be compressed by the HMID 200 and transmitted to the base station 260 via connection 280. The frames may be decompressed and processed by the base station 260, also using other world sensor information such as depth or range information and motion information received from the HMID 200 via the connection 280, to detect and recognize objects and surfaces in the real world environment, and to determine locations, distances, and velocities of the objects and surfaces with respect to the user 290's current position and motion. The VR system may use the information obtained from analyzing the world sensor information in performing one or more of the redirected walking methods as described herein. For example, determined locations, distances, and velocities of the detected objects and surfaces may be used in applying the redirected walking methods to guide the user's real world path around or away from the objects and surfaces and to keep the user within the boundaries of a constrained physical environment.

In some embodiments, virtual representations of at least some real world objects and surfaces that are detected via the world sensors may be composited into the VR world views displayed to the user 290. The virtual representations may correspond to the actual objects (e.g., a physical chair may be shown as a virtual chair, a physical wall may be shown as a virtual wall, etc.) or may be represent some other object (e.g., a physical chair may be represented by a virtual bush, a physical wall may be represented by a virtual fence, etc.)

In some embodiments, if the connection 280 to the base station 200 is lost for some reason, at least some video frames captured by cameras 200 may be processed by processors 204 of HMD 200 to provide a virtual view of the real environment to the user 290 via display 202. This may, for example, be done for safety reasons so that the user 290 can view the real environment that they are in if the connection 280 to the base station 260 is lost for some reason. In some embodiments, the processors 204 may render virtual content to be displayed in the virtual view, for example a message informing the user 290 that the connection 280 has been lost.

In some embodiments there may be two scene cameras 220 (e.g., a left and a right camera 220) located on a front surface of the HMD 200 at positions that are substantially in front of each of the user 290's eyes 292. However, in various embodiments, more or fewer scene cameras 220 may be used in a HMD 200 to capture video of the user 290's environment, and scene cameras 220 may be positioned at other locations. In an example non-limiting embodiment, scene cameras 220 may include high quality, high resolution RGB video cameras, for example 10 megapixel (e.g., 3072× 3072 pixel count) cameras with a frame rate of 60 frames per second (FPS) or greater, horizontal field of view (HFOV) of greater than 90 degrees, and with a working distance of 0.1 meters (m) to infinity.

In some embodiments, the world sensors may include one or more world mapping sensors 221 (e.g., infrared (IR) cameras with an IR illumination source, or Light Detection and Ranging (LIDAR) emitters and receivers/detectors) that, for example, capture depth or range information for objects and surfaces in the user's environment. The range information may, for example, be used in conjunction with frames captured by scene cameras 220 to detect and recognize objects and surfaces in the real world environment, and to determine locations, distances, and velocities of the objects and surfaces with respect to the user 290's current position and motion. The range information may also be used in positioning virtual representations of real-world objects to be composited into the virtual environment at correct depths. In some embodiments, the range information may be used in detecting the possibility of collisions with real-world objects and surfaces so that the redirected walking methods can be employed to adjust the user 290's path in the real world environment. In some embodiments there may be one world mapping sensor 221 located on a front surface of the HMD 200. However, in various embodiments, more than one world mapping sensor 221 may be used, and world mapping sensor(s) 221 may be positioned at other locations. In an example non-limiting embodiment, a world mapping sensor 221 may include an IR light source and IR camera, for example a 1 megapixel (e.g., 1000×1000 pixel count) camera with a frame rate of 60 frames per second (FPS) or greater, HFOV of 90 degrees or greater, and with a working distance of 0.1 m to 1.5 m.

In some embodiments, the world sensors may include one or more head pose sensors 222 (e.g., IR or RGB cameras) that may capture information about the position and/or motion of the user and/or the user's head in the real world environment. The information collected by head pose sensors 222 may, for example, be used to augment information collected by an inertial-measurement unit (IMU) 206 of the HMD 200. The augmented position and/or motion information may be used in determining how to render and display views of the VR environment and virtual content within the views. For example, different views of the VR environment may be rendered based at least in part on the position of the user's head, whether the user is currently walking through the VR environment, and so on. As another example, the augmented position and/or motion information may be used to composite virtual content into the VR scene in a fixed position relative to the background view of the VR environment. As another example, the augmented position and/or motion information may be used to determine when the user is turning their head so that a redirected walking method that adjusts rotation of the VR world based on the user's head movement can be applied. In some embodiments there may be two head pose sensors 222 located on a front or top surface of the HMD 200. However, in various embodiments, more or fewer sensors 222 may be used, and sensors 222 may be positioned at other locations. In an example non-limiting embodiment, head pose sensors 222 may include RGB or IR cameras, for example 400×400 pixel count cameras, with a frame rate of 120 frames per second (FPS) or greater, wide field of view (FOV), and with a working distance of 1m to infinity. The sensors 222 may include wide FOV lenses, and the two sensors 222 may look in different directions. The sensors 222 may provide low latency monochrome imaging for tracking head position and motion, and may be integrated with an IMU of the HMD 200 to augment head position and movement information captured by the IMU.

In some embodiments, the world sensors may include one or more light sensors 223 (e.g., RGB cameras) that capture lighting information (e.g., direction, color, and intensity) in the user's physical environment. In some embodiments there may be one light sensor 223 located on a front or top surface of the HMD 200. However, in various embodiments, more than one light sensor 223 may be used, and light sensor 223 may be positioned at other locations. In an example non-limiting embodiment, light sensor 223 may include an RGB high dynamic range (HDR) video camera, for example a 500×500 pixel count camera, with a frame rate of 30 FPS, HFOV of 180 degrees or greater, and with a working distance of 1m to infinity.

User sensors 224-227 may, for example, be located on external and internal surfaces of HMD 200, and may collect information about the user 290 (e.g., the user's expressions, eye movement, etc.). In some embodiments, the information collected by the user sensors may be used to adjust the collection of, and/or processing of information collected by, the world sensors 220-223 of the HMD 200. In some embodiments, the information collected by the user sensors 224-227 may be used to adjust the rendering of images to be displayed, and/or to adjust the display of the images by the display subsystem of the HMD 200. In some embodiments, the information collected by the user sensors 224-227 may be used in generating an avatar of the user 290 in the 3D virtual view displayed to the user by the HMD 200. In some embodiments, the information collected by the user sensors 224-227 may be used in interacting with or manipulating virtual content in the 3D virtual view displayed by the HMD 200. In some embodiments, the information collected by the user sensors 224-227 may be used in applying one or more of the redirected walking methods as described herein.

In some embodiments, the user sensors may include one or more eye tracking sensors 224 (e.g., IR cameras with an IR illumination source) that may be used to track position and movement of the user's eyes. In some embodiments, the information collected by the eye tracking sensors 224 may be used to adjust the rendering of images to be displayed, and/or to adjust the display of the images by the display subsystem of the HMD 200, based on the direction and angle at which the user's eyes are looking. In some embodiments, the information collected by the eye tracking sensors 224 may be used to match direction of the eyes of an avatar of the user 290 to the direction of the user's eyes. In some embodiments, brightness of the displayed images may be modulated based on the user's pupil dilation as determined by the eye tracking sensors 224.

In some embodiments, eye tracking sensors 224 may capture images of the eyes that may be analyzed by the base station 260 to detect blinks of the user's eyes. The redirected walking methods implemented by the VR system may include a method in which the VR application and system subtly rotate the VR world around the user during detected blinks. On average, blinks happen about 10 times per minute. Assuming that a 2 degree yaw rotation of the VR world goes undetected during a blink, the user may be rotated at a rate of 20 degrees per minute when the user is not moving by subtly rotating the VR world by up to 2 degrees when each blink is detected.

In some embodiments there may be two eye tracking sensors 224 located on an inner surface of the HMD 200 at positions such that the sensors 224 have views of respective ones of the user 290's eyes 292. However, in various embodiments, more or fewer eye tracking sensors 224 may be used in a HMD 200, and sensors 224 may be positioned at other locations. In an example non-limiting embodiment, each eye tracking sensor 224 may include an IR light source and IR camera, for example a 400×400 pixel count camera with a frame rate of 120 FPS or greater, HFOV of 70 degrees, and with a working distance of 10 millimeters (mm) to 80 mm.

In some embodiments, the user sensors may include one or more eyebrow sensors 225 (e.g., IR cameras with IR illumination) that track expressions of the user's eyebrows/forehead. In some embodiments, the user sensors may include one or more lower jaw tracking sensors 226 (e.g., IR cameras with IR illumination) that track expressions of the user's mouth/jaw. For example, in some embodiments, expressions of the brow, mouth, jaw, and eyes captured by sensors 224, 225, and 226 may be used to simulate expressions on an avatar of the user 290 in the virtual space, and/or to selectively render and composite virtual content for viewing by the user based at least in part on the user's reactions to the content displayed in the 3D virtual view. In some embodiments there may be two eyebrow sensors 225 located on an inner surface of the HMD 200 at positions such that the sensors 225 have views of the user 290's eyebrows and forehead. However, in various embodiments, more or fewer eyebrow sensors 225 may be used in a HMD 200, and sensors 225 may be positioned at other locations than those shown. In an example non-limiting embodiment, each eyebrow sensor 225 may include an IR light source and IR camera, for example a 250×250 pixel count camera with a frame rate of 60 FPS, HFOV of 60 degrees, and with a working distance of approximately 5 mm. In some embodiments, images from the two sensors 225 may be combined to form a stereo view of the user's forehead and eyebrows.

In some embodiments, the user sensors may include one or more lower jaw tracking sensors 226 (e.g., IR cameras with IR illumination) that track expressions of the user's jaw and mouth. In some embodiments there may be two lower jaw tracking sensors 226 located on an inner surface of the HMD 200 at positions such that the sensors 226 have views of the user 290's lower jaw and mouth. However, in various embodiments, more or fewer lower jaw tracking sensors 226 may be used in a HMD 200, and sensors 226 may be positioned at other locations than those shown. In an example non-limiting embodiment, each lower jaw tracking sensor 226 may include an IR light source and IR camera, for example a 400×400 pixel count camera with a frame rate of 60 FPS, HFOV of 90 degrees, and with a working distance of approximately 30 mm. In some embodiments, images from the two sensors 226 may be combined to form a stereo view of the user's lower jaw and mouth.

In some embodiments, the user sensors may include one or more hand sensors 227 (e.g., IR cameras with IR illumination) that track position, movement, and gestures of the user's hands, fingers, and/or arms. For example, in some embodiments, detected position, movement, and gestures of the user's hands, fingers, and/or arms may be used to simulate movement of the hands, fingers, and/or arms of an avatar of the user 290 in the virtual space. As another example, the user's detected hand and finger gestures may be used to determine interactions of the user with virtual content in the virtual space, including but not limited to gestures that manipulate virtual objects, gestures that interact with virtual user interface elements displayed in the virtual space, etc. In some embodiments there may be one hand sensor 227 located on a bottom surface of the HMD 200. However, in various embodiments, more than one hand sensor 227 may be used, and hand sensor 227 may be positioned at other locations. In an example non-limiting embodiment, hand sensor 227 may include an IR light source and IR camera, for example a 500×500 pixel count camera with a frame rate of 120 FPS or greater, HFOV of 90 degrees, and with a working distance of 0.1 m to 1 m.

FIG. 3 is a block diagram illustrating components of an example virtual reality system, according to at least some embodiments. In some embodiments, a virtual reality system may include a HMD 300 such as a headset, helmet, goggles, or glasses, and a base station 360 (e.g., a computing system, game console, etc.).

HMD 300 may include a display 302 component or subsystem via which VR frames received from base station 360 may be displayed to the user to provide a 3D virtual view 310 of a VR world provided by a VR application executing on the base station 360; different virtual content may be displayed at different depths in the virtual space. In some embodiments, virtual representations of real-world objects 312 (e.g., detected by world sensors 320) may be overlaid on or composited in the 3D virtual view 310 provided by the HMD 300.

Display 302 may implement any of various types of virtual reality display technologies. For example, the HMID 300 may include a near-eye VR display that displays frames including left and right VR images on screens that are viewed by a user, such as DLP (digital light processing), LCD (liquid crystal display) and LCoS (liquid crystal on silicon) technology displays. As another example, the HMID 300 may include a direct retinal projector that scans frames including left and right VR images, pixel by pixel, directly to the user's eyes via a reflective surface (e.g., reflective eyeglass lenses). To create a three-dimensional (3D) effect in 3D virtual view 310, objects at different depths or distances in the two images are shifted left or right as a function of the triangulation of distance, with nearer objects shifted more than more distant objects.

HMD 300 may also include a controller 304 comprising one or more processors configured to implement TIMID-side functionality of the virtual reality system. In some embodiments, HMID 300 may also include a memory 330 configured to store software (code 332) of the HMD component of the virtual reality system that is executable by the controller 304, as well as data 334 that may be used by the code 332 when executing on the controller 304.

In various embodiments, controller 304 may be a uniprocessor system including one processor, or a multiprocessor system including several processors (e.g., two, four, eight, or another suitable number). Controller 304 may include central processing units (CPUs) configured to implement any suitable instruction set architecture, and may be configured to execute instructions defined in that instruction set architecture. For example, in various embodiments controller 304 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 304 may employ any microarchitecture, including scalar, superscalar, pipelined, superpipelined, out of order, in order, speculative, non-speculative, etc., or combinations thereof. Controller 304 may include circuitry to implement microcoding techniques. Controller 304 may include one or more processing cores each configured to execute instructions. Controller 304 may include one or more levels of caches, which may employ any size and any configuration (set associative, direct mapped, etc.). In some embodiments, controller 304 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 304 may include one or more other components for processing and rendering video and/or images, for example image signal processors (ISPs), coder/decoders (codecs), etc. In some embodiments, controller 304 may include at least one system on a chip (SOC).

Memory 330 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 300 may include at least one inertial-measurement unit (IMU) 306 configured to detect position and/or motion of the HMD 300, and to provide the detected position and/or motion data to the controller 304 of the HMD 300.

In some embodiments, the HMD 300 may include world sensors 320 that collect information about the user's environment (video, depth information, lighting information, etc.), and user sensors 322 that collect information about the user (e.g., the user's expressions, eye movement, hand gestures, etc.). The sensors 320 and 322 may provide the collected information to the controller 304 of the HMD 300. Sensors 320 and 322 may include, but are not limited to, visible light cameras (e.g., video cameras), infrared (IR) cameras, IR cameras with an IR illumination source, Light Detection and Ranging (LIDAR) emitters and receivers/detectors, and laser-based sensors with laser emitters and receivers/detectors. World and user sensors of an example HMD are shown in FIG. 2.

HMD 300 may also include one or more interfaces 308 configured to communicate with an external base station 360 via a connection 380 to send sensor inputs to the base station 360 and receive rendered frames from the base station 360. In some embodiments, interface 308 may implement a proprietary wireless communications technology (e.g., 60 gigahertz (GHz) wireless technology) that provides a highly directional wireless connection 380 between the HMD 300 and the base station 360. However, other commercial (e.g., Wi-Fi, Bluetooth, etc.) or proprietary wireless communications technologies may be used in some embodiments. In some embodiments, interface 308 may implement a wired connection 380 between the HMD 300 and base station 360.

Base station 360 may be or may include any type of computing system or computing device, such as a desktop computer, notebook or laptop computer, pad or tablet device, smartphone, hand-held computing device, game controller, game system, and so on. Base station 360 may include a controller 362 comprising one or more processors configured to implement base-side functionality of the virtual reality system as described herein. Base station 360 may also include a memory 364 configured to store software (code 366) of the base station component of the virtual reality system that is executable by the controller 362, as well as data 368 that may be used by the code 366 when executing on the controller 362. Code 366 may, for example, include one or more VR applications, and may also include code for executing one or more of the redirected walking methods as described herein. The redirected walking methods may, for example, be implemented as software modules or functions in VR applications that execute on the base station 360. Alternatively, the redirected walking methods may be implemented as plug-in modules or libraries that may be added to or compiled into VR applications. As another alternative, the redirected walking methods may be implemented by software and/or hardware of the base station 360 and may be applied by the base station controller 362 to VR content generated by VR applications executing on the base station 360 when rendering VR frames for display.

In various embodiments, controller 362 may be a uniprocessor system including one processor, or a multiprocessor system including several processors (e.g., two, four, eight, or another suitable number). Controller 362 may include central processing units (CPUs) configured to implement any suitable instruction set architecture, and may be configured to execute instructions defined in that instruction set architecture. For example, in various embodiments controller 362 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 362 may employ any microarchitecture, including scalar, superscalar, pipelined, superpipelined, out of order, in order, speculative, non-speculative, etc., or combinations thereof. Controller 362 may include circuitry to implement microcoding techniques. Controller 362 may include one or more processing cores each configured to execute instructions. Controller 362 may include one or more levels of caches, which may employ any size and any configuration (set associative, direct mapped, etc.). In some embodiments, controller 362 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 362 may include one or more other components for processing and rendering video and/or images, for example image signal processors (ISPs), coder/decoders (codecs), etc. In some embodiments, controller 362 may include at least one system on a chip (SOC).

Memory 364 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Base station 360 may also include one or more interfaces 370 configured to communicate with HMD 300 via a connection 380 to receive sensor inputs from the HMD 300 and send rendered frames from the base station 360 to the HMD 300. In some embodiments, interface 370 may implement a proprietary wireless communications technology (e.g., 60 gigahertz (GHz) wireless technology) that provides a highly directional wireless connection 380 between the HMD 300 and the base station 360. In some embodiments, the directionality and band width (e.g., 60 GHz) of the wireless communication technology may support multiple HMDs 300 communicating with the base station 360 at the same time to thus enable multiple users to use the system at the same time in a co-located environment. However, other commercial (e.g., Wi-Fi, Bluetooth, etc.) or proprietary wireless communications technologies may be used in some embodiments. In some embodiments, interface 370 may implement a wired connection 380 between the HMD 300 and base station 360.

The base station 360 may be configured to render and transmit VR frames to the HMD 300 to provide a 3D virtual view 310 of a VR world provided by the VR application. The virtual view 310 may show a VR environment including virtual objects, avatars of the user and/or of other users, etc. that the user may explore by moving about in a real environment. In some embodiments, the virtual view 310 may also include virtual representations of real objects 312 in the user's real environment, based at least in part on information captured by world sensors 320. The base station 360 may be configured to adjust the 3D virtual view 310 according to one or more of the redirected walking methods described herein to guide the user's movements in the real environment as the user explores the VR environment as shown to the user by the HMD 300 in the 3D virtual view 310.

Figure 4:
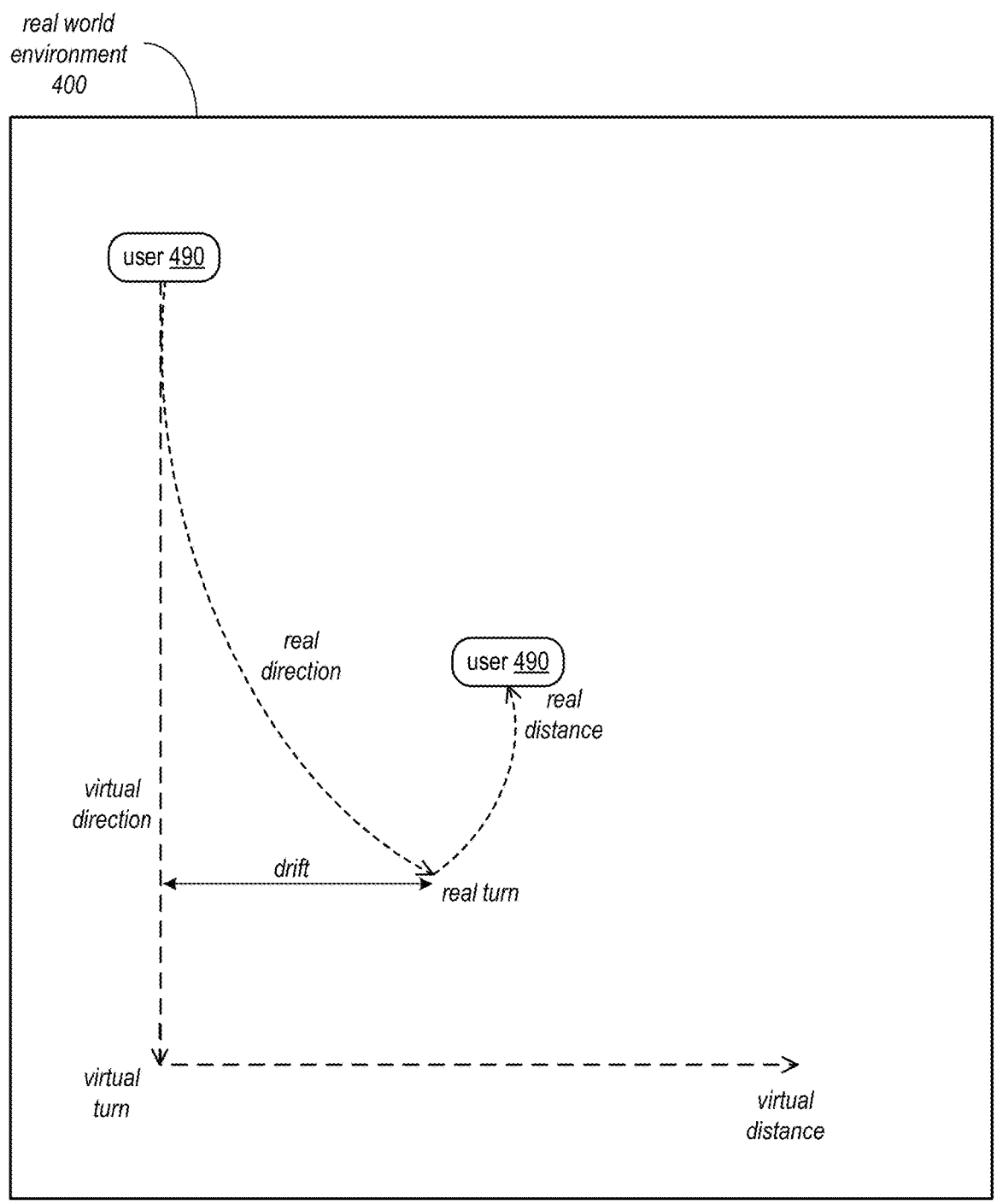
FIG. 4 graphically illustrates applying redirected walking methods in a VR system to keep a user within a physical boundary, according to some embodiments.

FIG. 4 graphically illustrates applying redirected walking methods in a VR system to keep a user within a physical boundary, according to some embodiments. Redirected walking methods may be executed on a VR system, for example as illustrated in FIGS. 1 through 3, to guide or redirect a user 490's movements within a constrained real world environment 400 such as a room, gym, yard, or field, while the user 490 perceives that they are freely moving about within a virtual world provided by a VR application on the VR system. One or more of the redirected walking methods may be applied to provide subtle visual cues to the user 490 via the HMD that may cause the user 490 to adjust their path or real direction within the physical environment 400 while they are traveling a path or virtual direction in the virtual world provided by the VR application and system. For example, in the virtual world, it may appear to the user that they are walking along a straight path, while in the physical world the redirected walking methods are subtly causing the user to walk in a curved or even circular path.

In addition, a redirected walking method may be applied to decrease or increase the rate of turns that the user 490 makes in the VR environment. By decreasing the apparent rate of a turn in the VR world, the user may be manipulated to compensate with a steeper turn in the real world. Decreases of up to 20% of the rotational rate and increases of up to 70% of the rotational rate may remain unnoticed by users.

In addition, a redirected walking method may be applied to increase the apparent rate of forward motion in the VR world by up to 30% to create an illusion of a larger space. Thus, the real distance the user 490 travels in the real environment 400 may be less than the distance that the user 490 perceives they have traveled in the virtual world.

By applying the redirected walking methods, the user 490's movement in the physical environment 400 may be constrained, while the user is experiencing unconstrained movement within the virtual world provided by the VR application and system. Note, however that the redirected walking methods may also be applied by a VR system to guide or redirect a user 490's movements in an unconstrained real world environment, for example to help the user to avoid obstacles, barriers, and hazards in the real world while they are exploring the VR world.

FIGS. 5A through 5H graphically illustrate several redirected walking methods, according to at least some embodiments. The redirected walking methods illustrated in FIGS. 5A through 5H may, for example, be performed by VR applications executing on the VR systems, for example as illustrated in FIGS. 1 through 3, for guiding or redirecting users' movements within constrained physical environments such as rooms, gyms, yards, or fields, or in unconstrained physical environments, while the users perceive that they are freely moving about within the virtual worlds provided by the VR applications and systems.

Figure 5A:
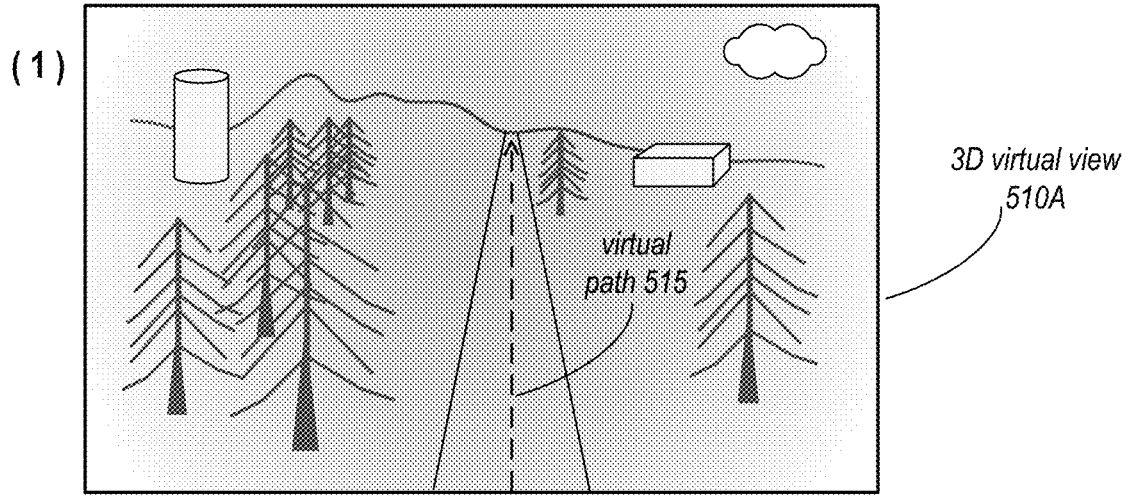
FIGS. 5A through 5C graphically illustrate a redirected walking method in which the VR application and system introduces a subtle visual yaw rotation of a VR world, according to some embodiments.
Figure 5A:
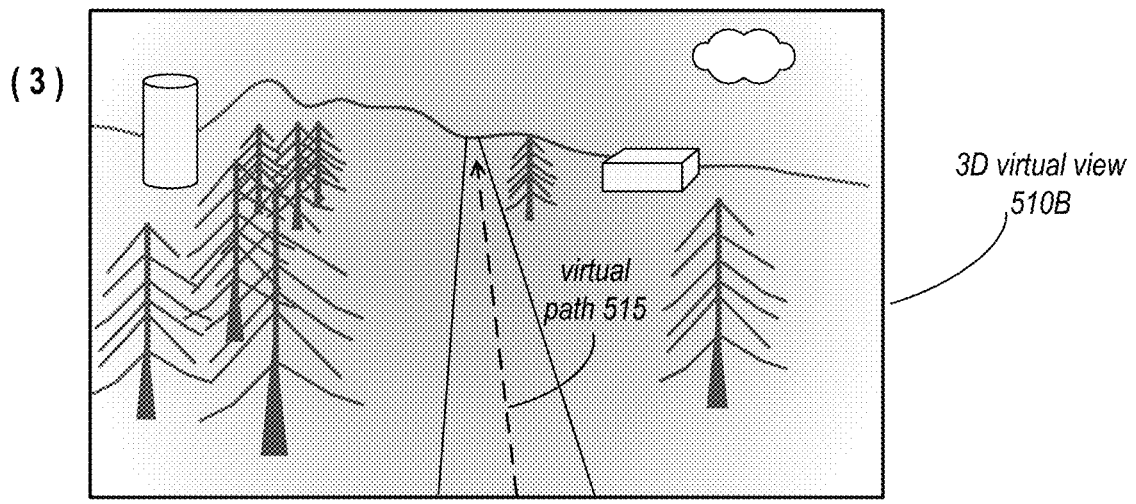
Figure 5B:
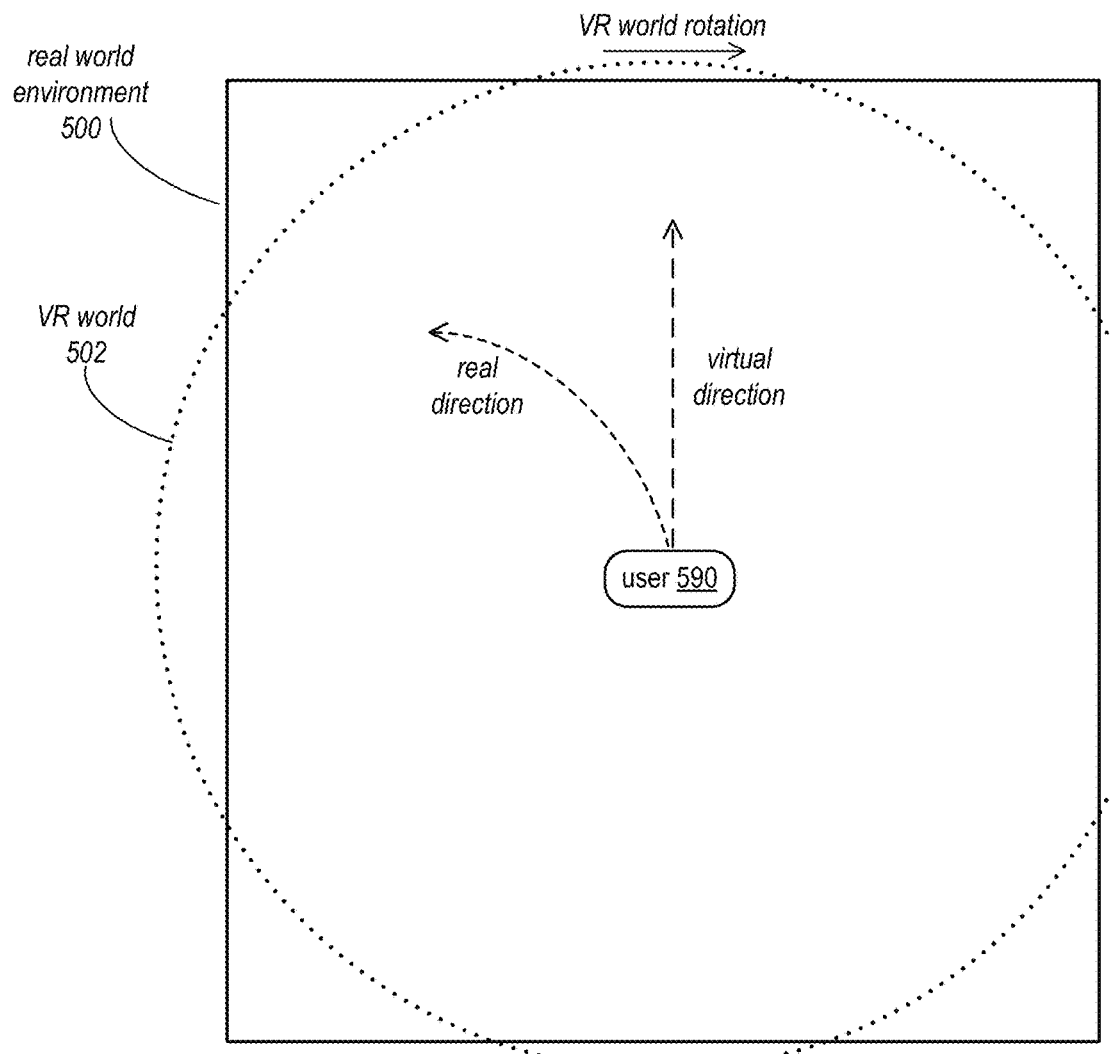
Figure 5C:
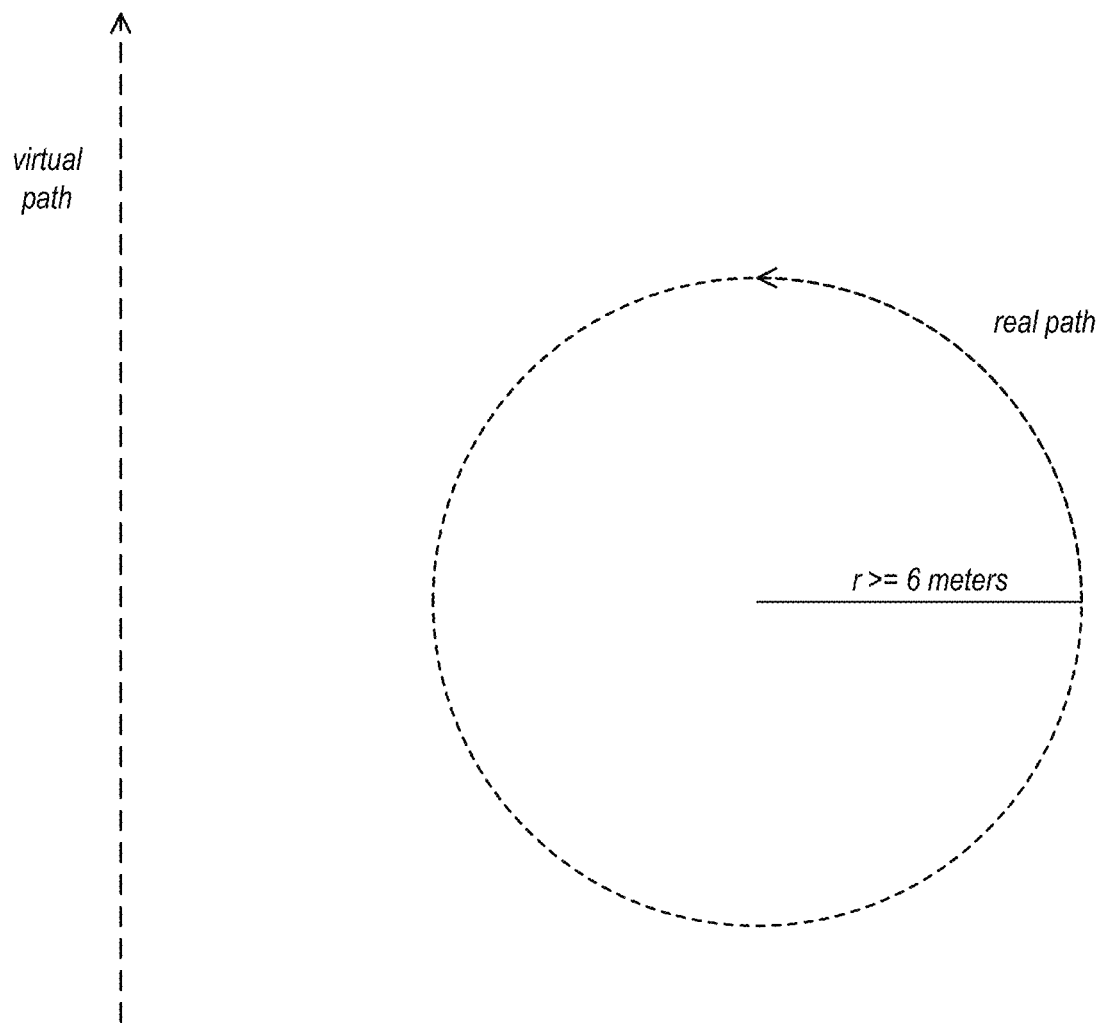

FIGS. 5A through 5C graphically illustrate a redirected walking method in which the VR application and system introduces a subtle visual yaw rotation of a VR world 502. As shown in FIG. 5A, (1), the user may be walking in a VR world 502 displayed as a 3D virtual view 510A, for example along a straight path 515. The VR world 502 may be slowly rotated left or right as the user walks (in this example, rotated right as shown at FIG. 5A (2)). As shown at FIG. 5A, (3), the right rotation causes the content in the 3D virtual view 510B (e.g., path 515) to be shifted to the left. As shown in FIG. 5B, the rotation of the VR world 502 may cause the user 590 to consciously or subconsciously correct their physical motion path in the real world environment 500 in the direction opposite to the VR world 502 rotation in order to keep walking straight (e.g., stay on the straight path 515) in the VR world 502. In this example, the user turns slightly to the left to follow the path 515 that shifted slightly to the left in response to the right rotation of the VR world 502 as shown in FIG. 5A. As shown in FIG. 5C, this rotation technique may, for example, allow the VR application and system to steer the user around a circle, for example a circle with a six meter or greater radius, without the user realizing it. To the user, it may appear that they are walking straight on a straight path in the virtual world displayed in the 3D virtual view 510, while in the real world environment 500 they are actually walking in a circle. Note that this redirected walking method may be applied with a higher rotation rate to steer the user in a tighter circle (e.g., <6 meter radius), for example in smaller physical environments with at least one horizontal dimension that is less than 12 or 13 meters. However, the user may begin to realize that they are not walking straight as the rotation rate is increased.

Figure 5D:
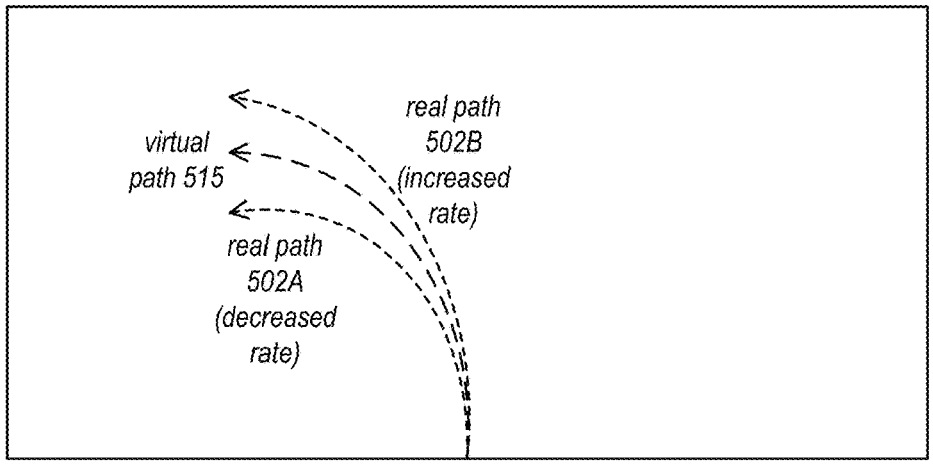
FIG. 5D graphically illustrates a redirected walking method in which the VR application and system decrease or increase the rate of turns that the user makes in the VR environment, according to some embodiments.

FIG. 5D graphically illustrates a redirected walking method in which the VR application and system decrease or increase the rate of turns that the user makes in the VR environment. By decreasing the apparent rate of a turn visible in the VR world (virtual path 515), the user is manipulated to compensate with a steeper turn (real path 502A) in the real world. By increasing the apparent rate of a turn visible in the VR world (virtual path 515), the user is manipulated to compensate with a wider turn (real path 502B) in the real world. Decreases of up to 20% of the rotational rate and increases of up to 70% of the rotational rate may remain unnoticed by users.

Figure 5E:
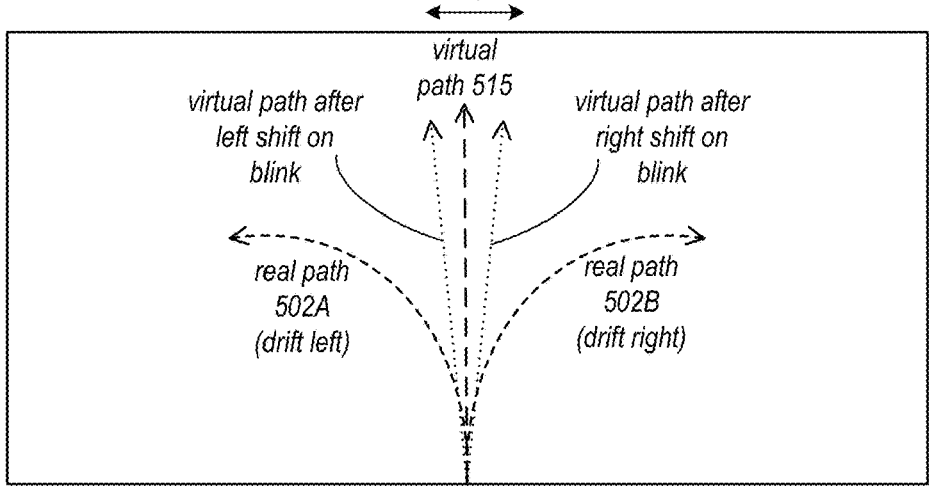
FIG. 5E graphically illustrates a redirected walking method in which the VR application and system subtly rotate the VR world around the user during blinks, according to some embodiments.

FIG. 5E graphically illustrates a redirected walking method in which the VR application and system subtly rotate the VR world around the user during blinks. The HMD may include eye tracking sensors that the VR system may use to detect blinks. During each blink, the VR application and system may rotate the virtual world left or right, for example by about 2 degrees. FIG. 5E shows the original virtual path 515, and also shows the virtual path after a left shift of the path (right rotation of the VR world) on a blink, and after a right shift of the path (left rotation of the VR world) on a blink. Each shift causes the user to subconsciously adjust their path 502 in the real world environment. Each left shift may cause the user to adjust slightly to the left, and each right shift may cause the user to adjust slightly to the right. FIG. 5E shows the real path drifting left as a result of left shifts (path 502A), and the real path drifting right as a result of right shifts (path 502B). On average, blinks happen about 10 times per minute. Assuming that a 2 degree yaw rotation of the VR world goes undetected during a blink, the user may be rotated at a rate of 20 degrees per minute when the user is not moving by subtly rotating the VR world by up to 2 degrees when each blink is detected.

Figure 5F:
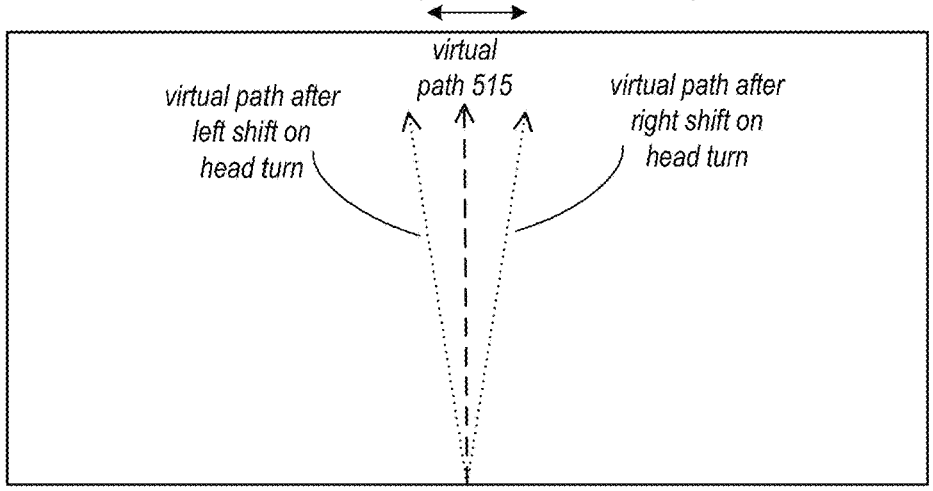
FIG. 5F graphically illustrates a redirected walking method in which the VR application and system change the rate at which the VR world is rotated during head rotations without the user necessarily physically moving anywhere, according to some embodiments.

FIG. 5F graphically illustrates a redirected walking method in which the VR application and system change the rate at which the VR world is rotated during head rotations without the user necessarily physically moving anywhere. For example, the VR system may detect via motion sensors of the HMD that the user is turning their head to the left or right. The rate at which the VR world is rotated in response to the head motion may be slightly increased while the head is turning away (e.g., up to 2 degrees/second) and slightly decreased while the head is turning back (e.g., up to 1 degree/second). Note that, in some embodiments, in some cases the head motion may be slightly decreased while the head is turning away (e.g., up to 1 degrees/second) and slightly increased while the head is turning back (e.g., up to 2 degree/second). Changing the rate of rotation of the VR world as the head is rotated results in the user's view of the VR world being somewhat rotated (e.g. up to 5 degrees) during the head turn, which may cause the user to compensate by reorienting themselves in the physical world to face in the correct direction in the virtual world. FIG. 5F shows the original virtual path 515 before a head turn is detected, and also shows the virtual path after a left shift on a head turn, and after a right shift on a head turn.

Figure 5G:
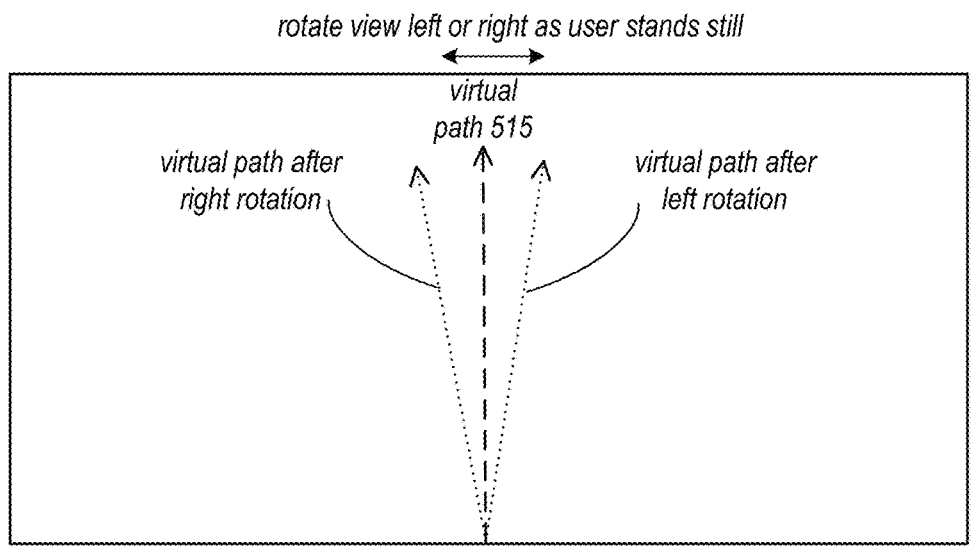
FIG. 5G graphically illustrates a redirected walking method in which the VR application and system imperceptibly rotate the VR world around the user continuously while the user is standing still, according to some embodiments.

FIG. 5G graphically illustrates a redirected walking method in which the VR application and system imperceptibly rotate the VR world around the user continuously while the user is standing still, which may cause the user to compensate in the physical world in the opposite direction of the rotation to reorient themselves in the virtual world. FIG. 5G shows the original virtual path 515, and also shows the virtual path after a left rotation, and after a right rotation.

Figure 5H:
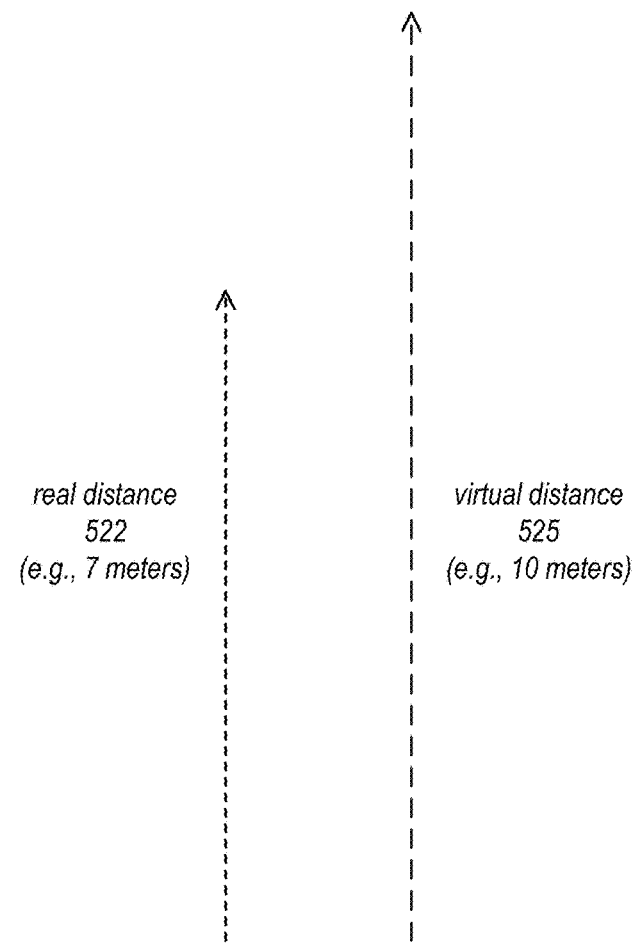
FIG. 5H graphically illustrates a redirected walking method in which the VR application and system increase the apparent rate of forward motion in the VR world to create an illusion of a larger space, according to some embodiments.

FIG. 5H graphically illustrates a redirected walking method in which the VR application and system increase the apparent rate of forward motion in the VR world to create an illusion of a larger space. As shown in FIG. 5H, by increasing the apparent rate of forward motion in the VR world, for example by up to 30%, the user may walk a distance 522 of, for example, 7 meters in the real world environment, while the user perceives that they have walked a greater distance 525, for example 10 meters, in the virtual world.

Figure 6A:
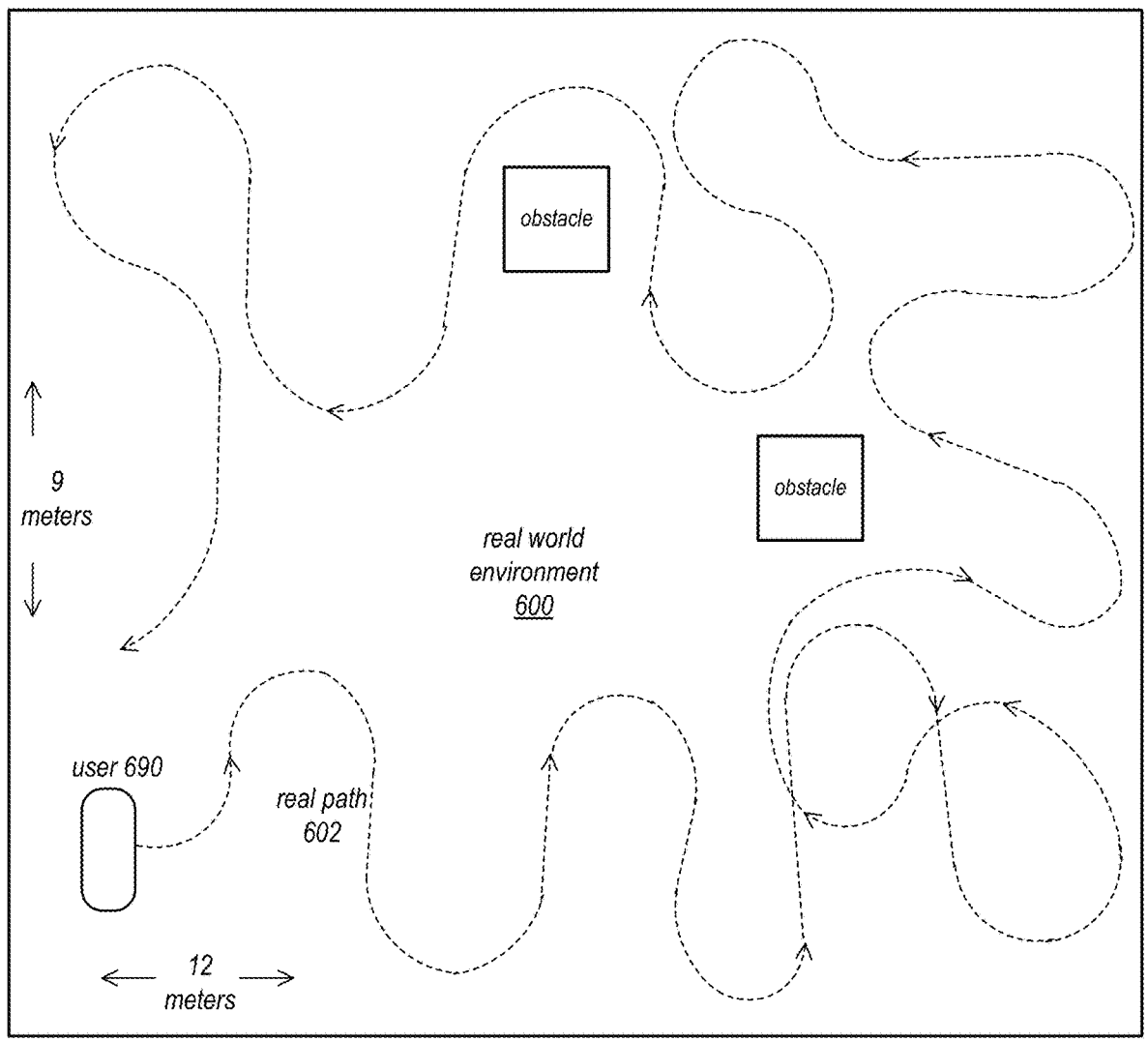
FIGS. 6A and 6B graphically illustrate an example real world path that a user may traverse in a physical environment when traversing a virtual path in a VR environment using a VR system that implements one or more of the redirected walking methods, according to some embodiments.
Figure 6B:
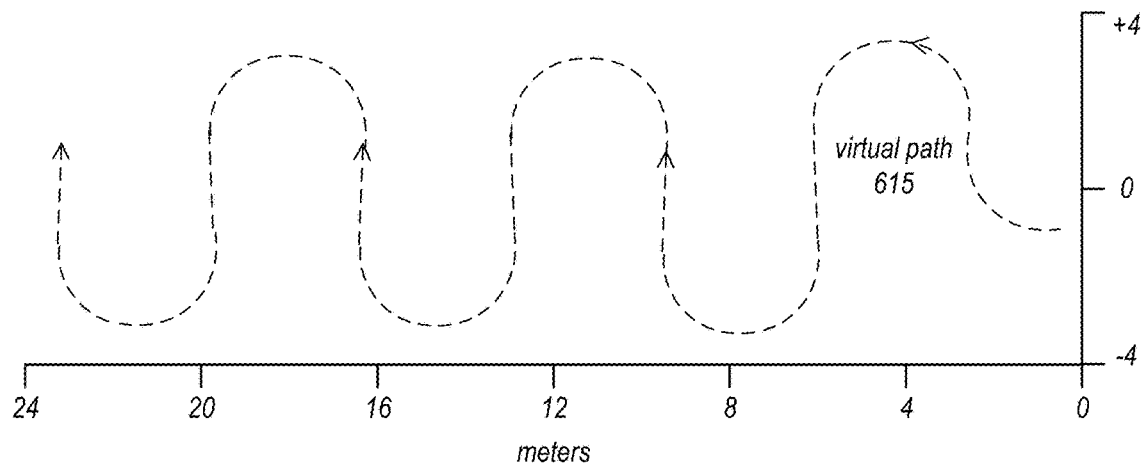
Figure 7A:
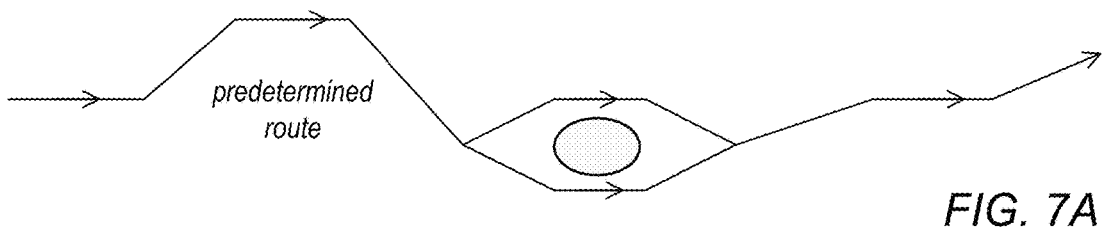
FIGS. 7A through 7C graphically illustrate example types of VR applications in which redirected walking methods may be applied.
Figure 7B:
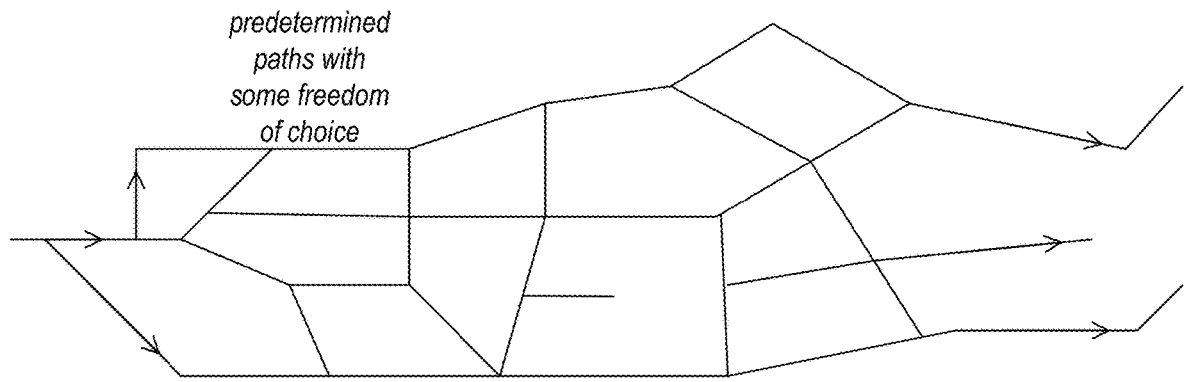
Figure 7C:
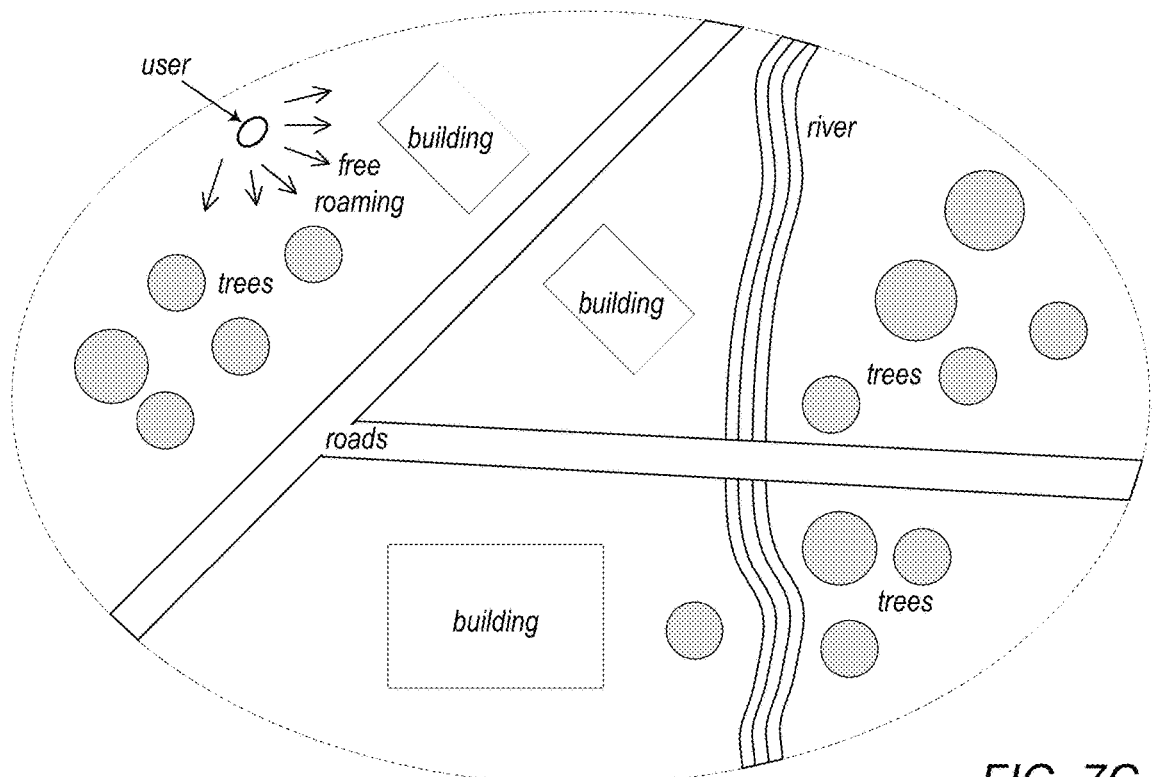

FIGS. 6A and 6B graphically illustrate an example real world path that a user may traverse in a constrained physical environment when traversing a virtual path in a VR environment using a VR system that implements one or more of the redirected walking methods, according to some embodiments. FIG. 6A shows a constrained real world environment 600, such as a room or yard, that in this example is approximately 9×12 meters in dimension. The environment 600 may include one or more stationary obstacles such as chairs, tables, trees, or bushes, and while not shown may also include moving objects such as other users. FIG. 6B illustrates an example virtual path 615 in a virtual world that the user 690 may travel. The virtual path 615 may be a predefined path (with possible forks) as shown in FIG. 7A or 7B, or may be a path 615 that the user 690 freely chooses to travel in an unconstrained virtual world as shown in FIG. 7C. FIG. 6A shows an example real path 602 that the user 690 may traverse in the real world environment 600 while traversing the virtual path 615 shown in FIG. 6B. The VR application and system may apply one or more of the redirected walking methods as illustrated in FIGS. 5A through 5H to safely steer the user 690 around obstacles and to contain the user 690 within the boundaries of the constrained physical environment 600 while the user is experiencing walking through the VR world on the virtual path 615.

FIGS. 7A through 7C graphically illustrate example types of VR applications in which redirected walking methods may be applied. The redirected walking methods may be implemented in different types of virtual reality scenarios that may be implemented by VR applications and systems. The scenarios differ in the complexity of the paths that the user is allowed to travel in the respective VR worlds.

FIG. 7A illustrates a first VR scenario in which the redirected walking methods may be implemented in which the user walks a predetermined path in a VR environment. In this scenario, the user follows a route through a VR environment defined by a visible path, signs, hallways, opened doors, obstacles, and so on. For example, the scenario may be a virtual tour of a cave with the only possible route through the cave marked, and all other paths fenced off or otherwise blocked. In this scenario, the redirected walking methods may be defined in advance according to the known turns of the route that the user may encounter. Local variations of the route may be allowed in this scenario; for example, the path may split or fork around an obstacle such as a stalagmite or boulder.

FIG. 7B illustrates a second VR scenario in which the redirected walking methods may be implemented. This scenario provides predetermined paths with some freedom of choice. In this scenario, the user may be restricted to several routes or paths, with occasional forks, passages, and the like that allow the user to select between different routes or paths. For example, the scenario may be a virtual walking tour of a city, where the user's choices of routes are sidewalks and streets that may be limited by canals, bridges, fences, narrow streets blocked with tourists, and other obstacles. In this scenario, the redirected walking methods may be applied while the user is walking a path in advance of the user reaching decision points (i.e., forks in the path). The user's choices are limited to several forks, and the user's approach to these potentially problematic decision spots may be prepared in advance by guiding the user using the redirected walking methods to points in the physical space that may allow the most freedom of movement and maneuvering if the user decides to change their route (e.g., turn left or right) at these points.

FIG. 7C illustrates a third VR scenario in which the redirected walking methods may be implemented. This scenario is a free roaming scenario in which the user is free to move in any direction; there are no predefined routes for the user to follow, although there may be virtual objects (e.g., walls, buildings, fences, rivers, trees, furniture, etc.) that the user has to avoid or walk around, or that the user can explore (e.g., by entering a building through a door). For example, the scenario may be a virtual world in which the user is free to roam around a virtual landscape with the user's avatar moving across an open terrain that may include various objects or obstacles (puddles, buildings, rivers, trees, fences, etc., or other users' avatars also exploring the virtual world) but that otherwise has few or no restrictions on the user's movements. In this scenario, most or all of the redirected walking methods may be employed to guide the user's movements in the physical environment as the user explores the virtual world. For this scenario, since there are no predefined paths that the user must follow, the VR application and system may implement algorithms that determine redirected walking adjustments in real time based at least in part on world sensor information collected by the HMD to adjust the user's path in the physical environment as the user explores the virtual world.

Figure 8:
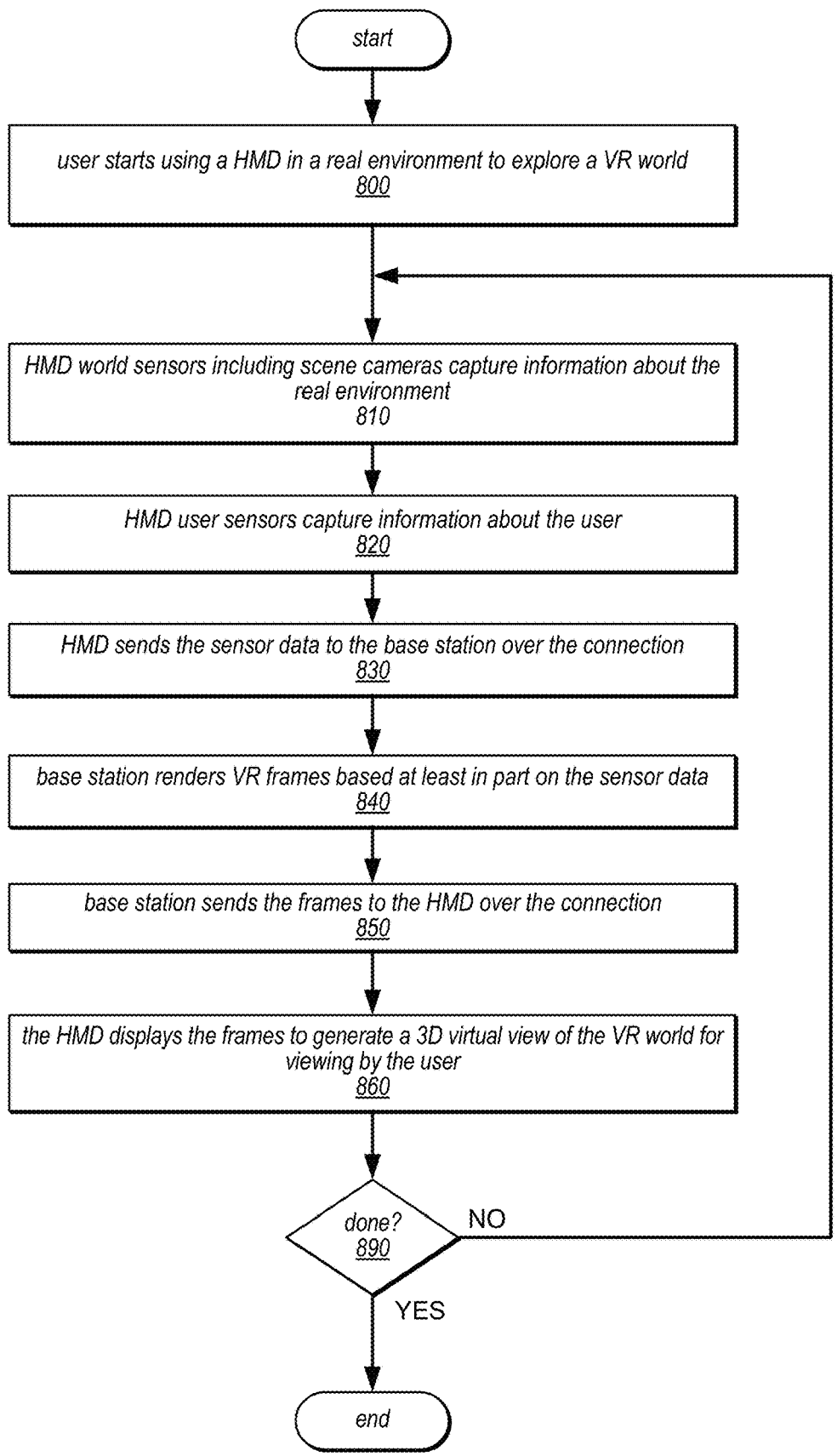
FIG. 8 is a flowchart of a method of operation for a virtual reality system as illustrated in FIGS. 1 through 3 that may implement one or more of the redirected walking methods as described herein, according to some embodiments.

FIG. 8 is a flowchart of a method of operation for a virtual reality system as illustrated in FIGS. 1 through 3 that may implement one or more of the redirected walking methods as described herein, according to some embodiments. The virtual reality system may include a HMID such as a headset, helmet, goggles, or glasses that includes a display component for displaying VR frames including left and right images to a user's eyes to thus provide 3D virtual views of a VR world to the user. The virtual reality system may also include a base station configured to receive sensor inputs, including frames captured by cameras on the HMD as well as eye and motion tracking inputs, from the HMD via a wired or wireless connection, render VR frames including virtual content at least in part according to the sensor inputs, and transmit the frames to the HMD via a connection through the interface for display.

As indicated at 800, a user may begin using a HMD in a real environment to explore a VR world provided by a VR application of the VR system. As indicated at 810, one or more world sensors on the HMD may capture information about the user's real environment (e.g., video, depth information, etc.). As indicated at 820, one or more user sensors on the HMD may capture information about the user (e.g., the user's expressions, eye movement, head movement, hand gestures, etc.). Elements 810 and 820 may be performed in parallel, and may be performed continuously to provide sensor inputs as the user uses the virtual reality system. As indicated at 830, the HMD sends at least some of the sensor data to the base station over the connection. In some embodiments, the HMD may perform some processing of the sensor data, for example compression and/or generation of motion information including but not limited to motion vectors for the user in the real environment, before transmitting the sensor data to the base station.

As indicated at 840, the base station may render VR frames that provide views of the VR world based at least in part on the inputs from the world and user sensors received from the HMD via the connection. At 840, the base station may apply one or more of the redirected walking methods as described herein when rendering the VR frames. As indicated at 850, the VR frames are sent to the HMD over the wired or wireless connection. In some embodiments, the base station encodes/compresses the rendered frames prior to sending the frames to the HMD over the connection. For example, a base station encoder may encode the frames according to a video encoding protocol (e.g., High Efficiency Video Coding (HEVC), also known as H.265, or MPEG-4 Part 10, Advanced Video Coding (MPEG-4 AVC), also referred to as H.264, etc.).

As indicated at 860, the HMD displays the VR frames received from the base station to generate a 3D virtual view of the VR world for viewing by the user. In some embodiments, a decoder on the HMD decompresses the frames received from the base station prior to display. As indicated by the arrow returning from element 890 to element 810, the base station may continue to receive and process inputs from the sensors and to render VR frames to be transmitted to the MD via the connection for display as long as the user is using the virtual reality system.

Figure 9:
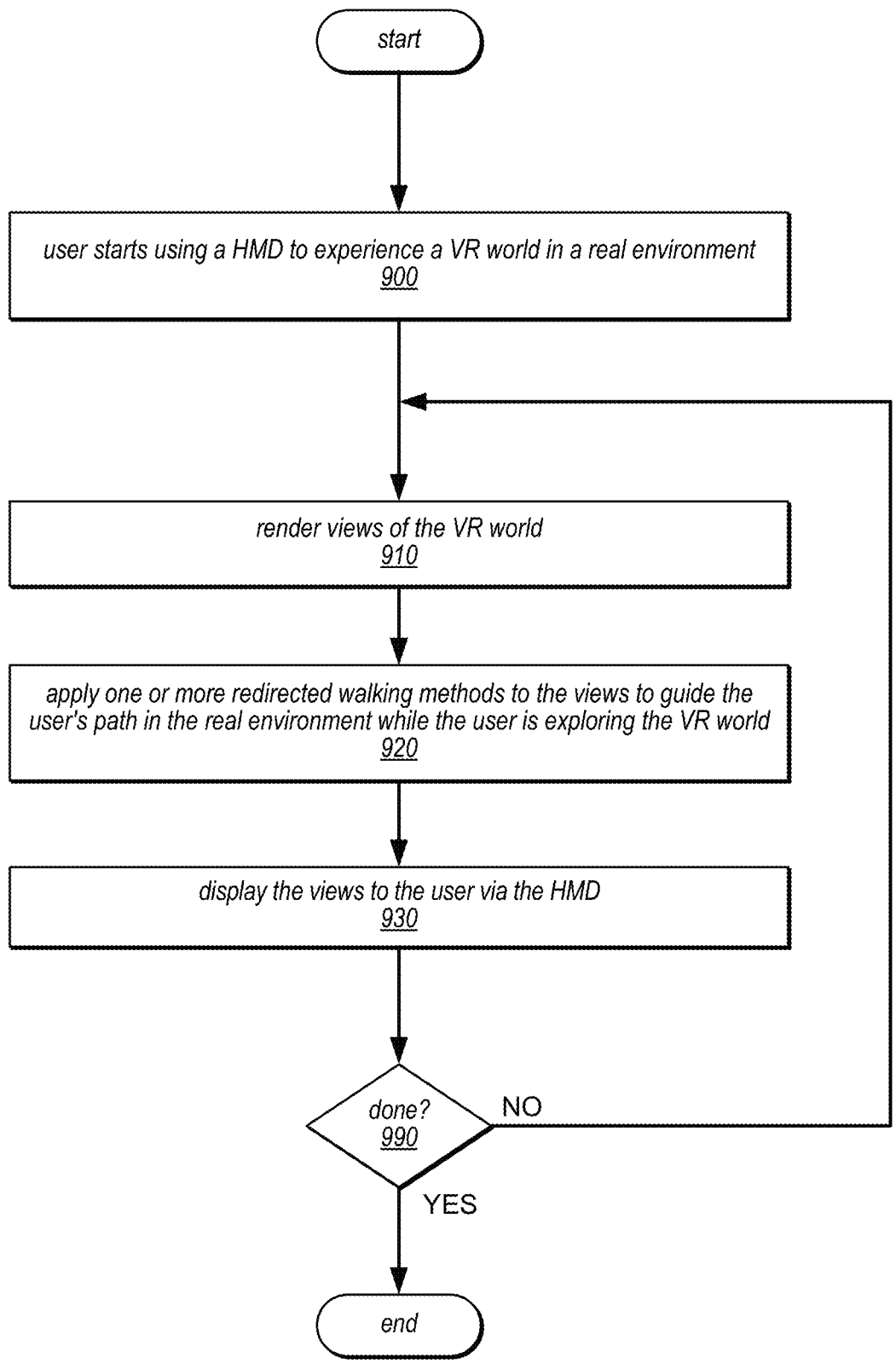
FIG. 9 is a flowchart of a high-level method for applying redirected walking methods in a virtual reality system as illustrated in FIGS. 1 through 3 and described in FIG. 8 to guide a user's path in a real environment while the user is exploring a VR world, according to some embodiments.

FIG. 9 is a flowchart of a high-level method for applying redirected walking methods in a virtual reality system as illustrated in FIGS. 1 through 3 and described in FIG. 8 to guide a user's path in a real environment while the user is exploring a VR world, according to some embodiments. As indicated at 900, a user may begin using a HMD in a real environment to explore a VR world provided by a VR application of the VR system. As indicated at 910, the VR system may render views of the VR world. As indicated at 920, the VR system may apply one or more of the redetected walking methods to the views to guide the user's path in the real environment while the user is exploring the VR world. As indicated at 930, the views are displayed to the user via the HMD. In response to visual cues introduced to the views by the redirected walking methods, the user may adjust their path in the real world environment. As indicated by the arrow returning from element 990 to element 910, the VR system may continue to render views, apply redirected walking methods to the views, and display the views as long as the user is using the virtual reality system to guide the user in the physical environment as the user is exploring the VR world.

Figure 10:
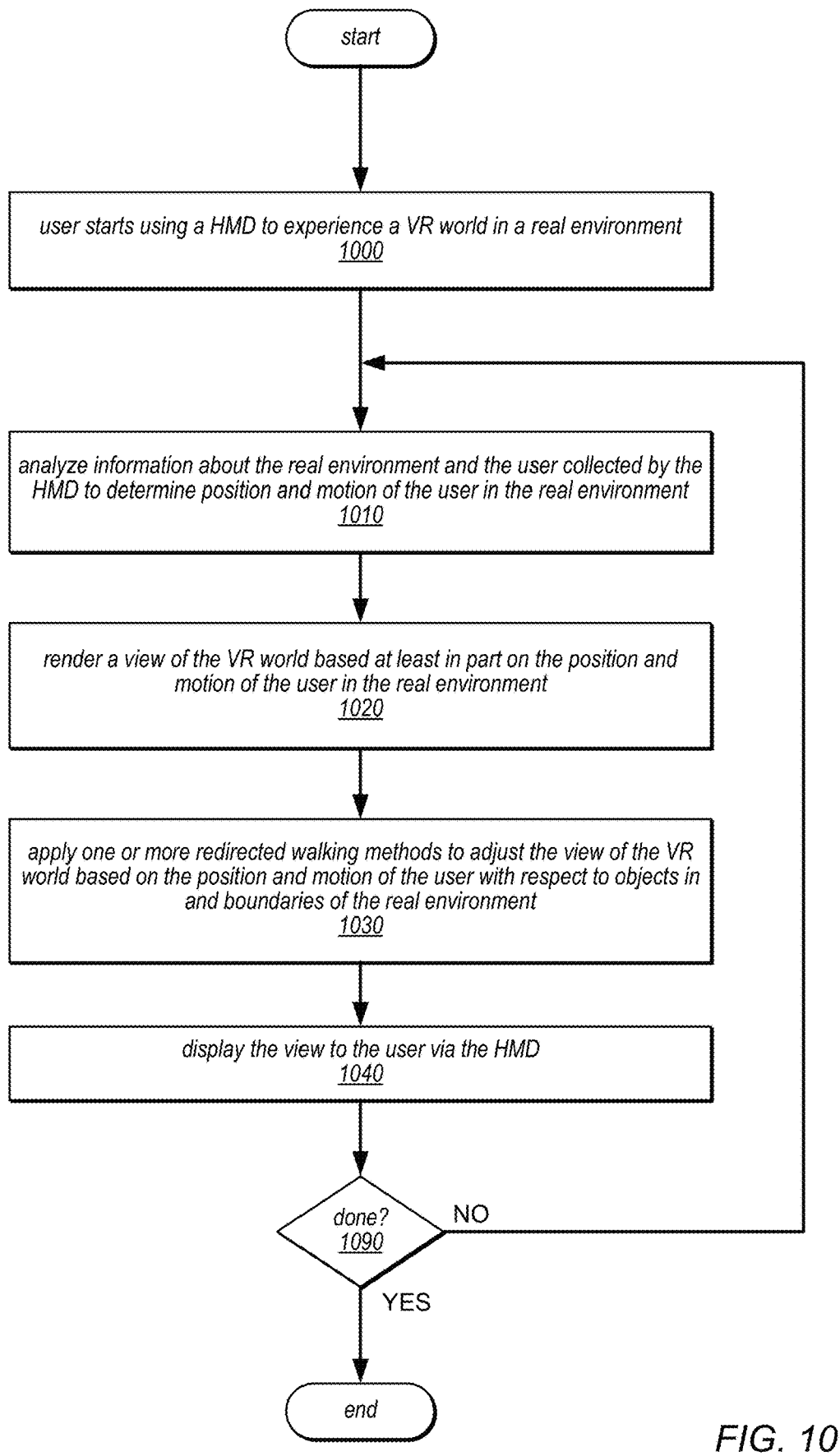
FIG. 10 is a flowchart of a method for applying redirected walking methods to adjust (e.g., shift) a view of a VR world to adjust a user's path in a real environment while the user is exploring the VR world, according to some embodiments.

FIG. 10 is a flowchart of a method for applying redirected walking methods to adjust (e.g., shift) a view of a VR world to adjust a user's path in a real environment while the user is exploring the VR world, according to some embodiments. As indicated at 1000, a user may begin using a HMD in a real environment to explore a VR world provided by a VR application of the VR system. As indicated at 1010, the VR system may analyze information about the real environment and the user collected by sensors of the HMD to determine position and motion of the user in the real environment. The information about the real environment and user collected by sensors of the HMD may be processed and analyzed by one or more processes executing on the HMD and/or on the base station. As indicated at 1020, the VR system may render a view of the VR world based at least in part on the position and motion of the user. As the user moves about in the real environment, VR views are rendered according to their position and motion. For example, if a user is walking straight ahead in the real environment, the VR view is rendered so that it appears to the user that they are walking straight ahead in the VR environment. If the user turns in the real environment, or rotates their head, the VR view is rendered so that it appears to the user that they are turning or rotating their head in the VR environment. As indicated at 1030, the VR system may apply one or more redirected walking methods to adjust (e.g., shift) the view of the VR world based on the position and motion of the user with respect to the VR world and objects in and boundaries of the real environment. As indicated at 1040, the shifted view may be displayed to the user via the MD. In response to visual cues introduced to the view by the redirected walking methods, the user may adjust their path in the real world environment. For example, a slight rotation of the VR view may cause the user to turn slightly in a direction opposite to the rotation. As indicated by the arrow returning from element 1090 to element 1010, the VR system may continue to analyze information, render views, apply redirected walking methods to the views, and display the views as long as the user is using the virtual reality system to guide the user in the physical environment as the user is exploring the VR world.

Figure 11:
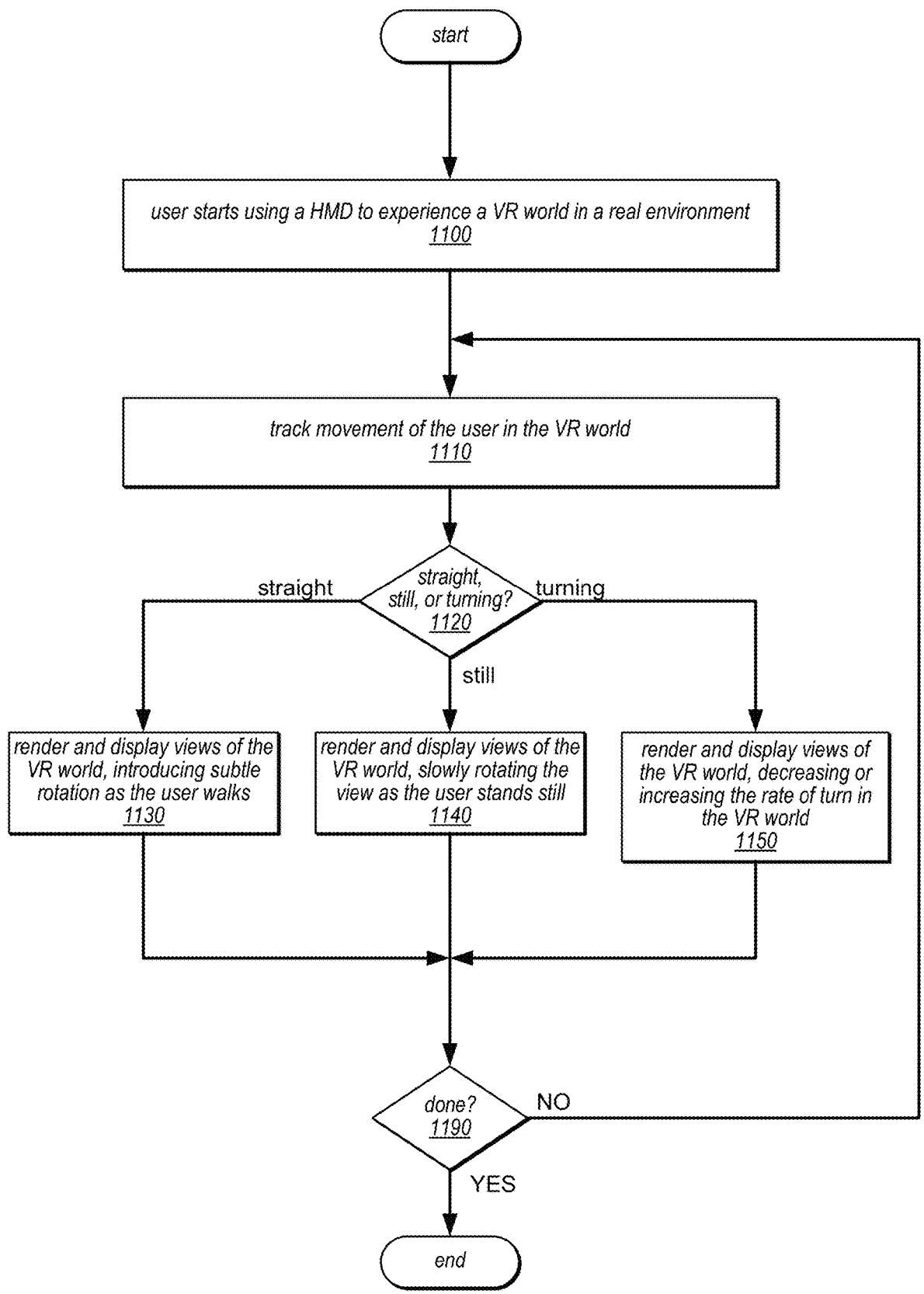
FIG. 11 is a flowchart of a redirected walking methods that guide a user in a physical environment by rotating the VR world while the user is exploring the VR world, according to some embodiments.

FIG. 11 is a flowchart of a redirected walking methods that guide a user in a physical environment by rotating the VR world while the user is exploring the VR world, according to some embodiments. As indicated at 1100, a user may begin using a HMD in a real environment to explore a VR world provided by a VR application of the VR system. As indicated at 1110, the VR system may track movement of the user in the VR world. For example, it may be detected that the user is walking straight in the VR world, or is standing still in the VR world, or is making a turn in the VR world.

At 1120, if the user is waling straight, then as indicated at 1130 the VR system may render and display views of the VR world, introducing subtle rotation of the views as the user walks, for example as illustrated in FIGS. 5A through 5C. At 1120, if the user is standing still, then as indicated at 1140 the VR system may render and display views of the VR world, slowly rotating the world as the user stands still, for example as illustrated in FIG. 5G. At 1120, if the user is making a turn in the VR world, then as indicated at 1150 the VR system may render and display views of the VR world, decreasing or increasing the rate of turn in the VR world, for example as illustrated in FIG. 5D. As indicated by the arrow returning from element 1190 to element 1110, the VR system may continue to track movement of the user and render and display the views by applying redirected walking techniques according to the user's detected movements as long as the user is using the virtual reality system to guide the user in the physical environment as the user is exploring the VR world.

Figure 12:
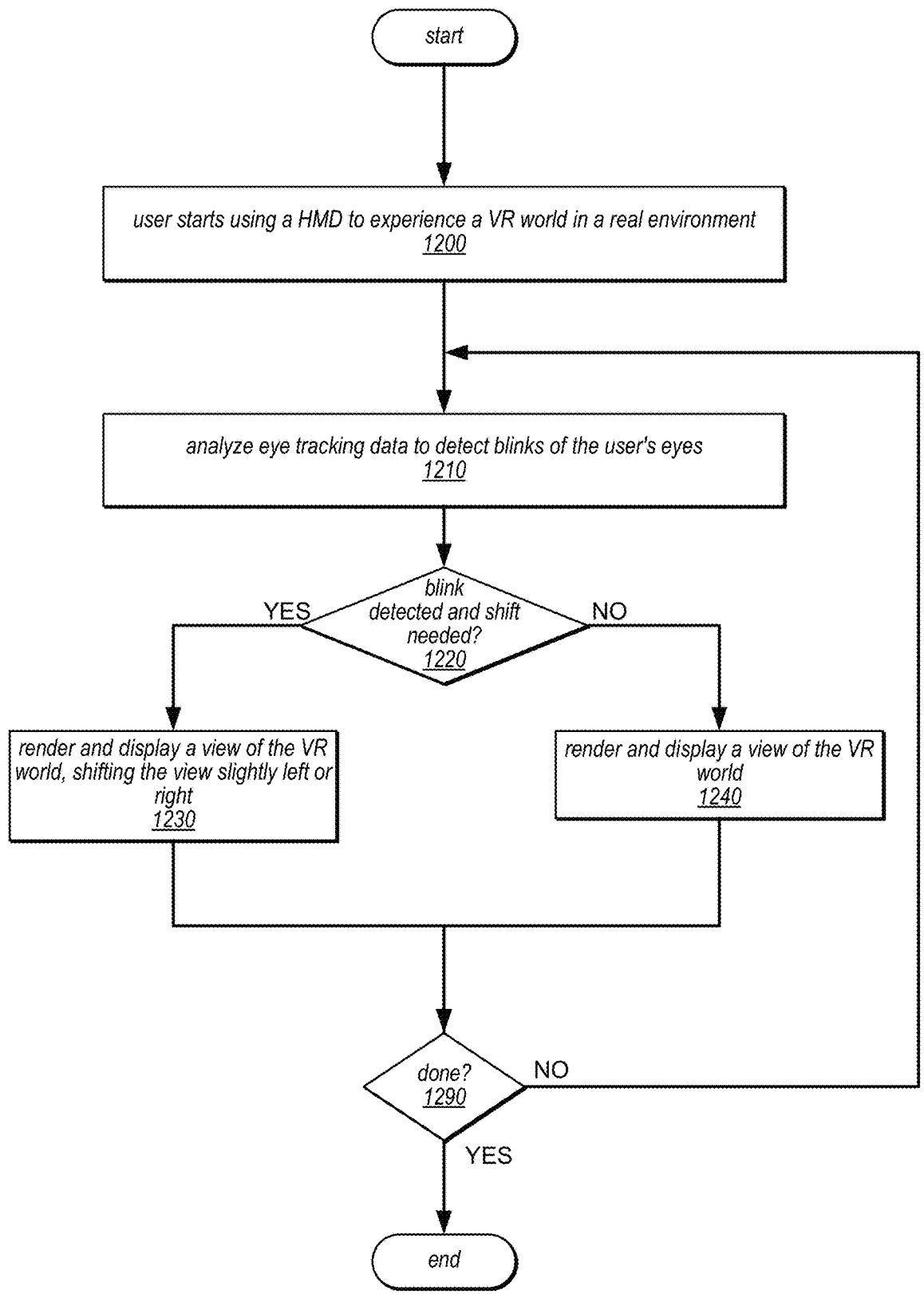
FIG. 12 is a flowchart of a redirected walking method that shifts the view of the VR world when the user blinks, according to some embodiments.

FIG. 12 is a flowchart of a redirected walking method that shifts the view of the VR world when the user blinks, according to some embodiments. The redirected walking method of FIG. 12 may be applied while the user is walking, turning, or standing still in the VR world. As indicated at 1200, a user may begin using a HMD in a real environment to explore a VR world provided by a VR application of the VR system. As indicated at 1210, the VR system may analyze eye tracking data captured by eye tracking sensors of the HMD to detect blinks of the user's eyes. At 1220, if a blink is detected and the user's real world direction needs to be adjusted by introducing a shift in the VR world, then as indicated at 1230 the VR system may render and display a view of the VR world, shifting the view slightly left or right (e.g., by 2 degrees or less), for example as illustrated in FIG. 5E. At 1220, if no blink is detected or there is no need to introduce a shift in the VR world at this time, then as indicated at 1240 the VR system may render and display a view of the VR world without applying the shift. Note, however, that one or more other redirected walking methods may be applied at 1240. As indicated by the arrow returning from element 1290 to element 1210, the VR system may continue to render and display views of the VR world, shifting the view when blinks are detected if necessary, as long as the user is using the virtual reality system to guide the user in the physical environment as the user is exploring the VR world.

Figure 13:
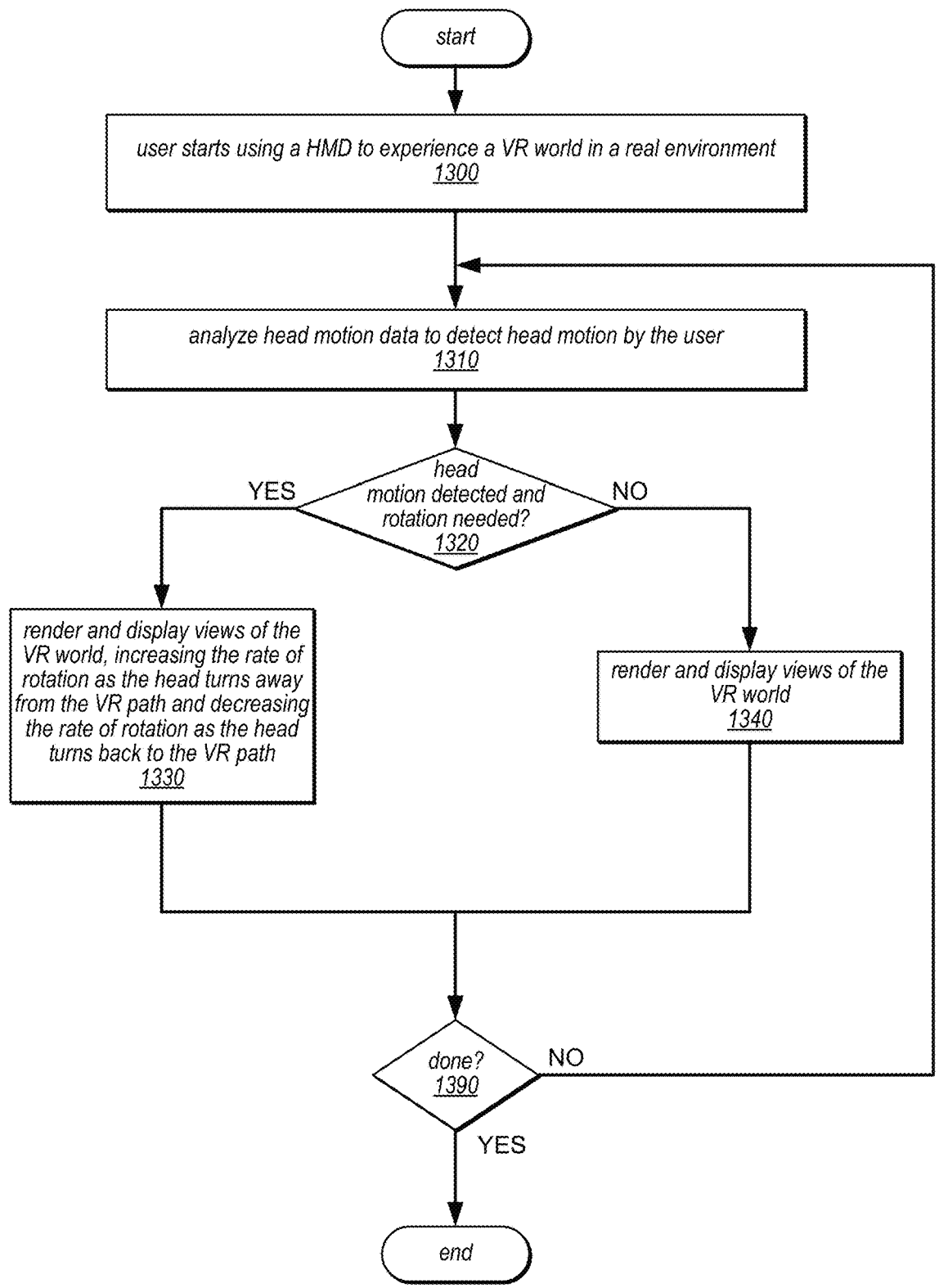
FIG. 13 is a flowchart of a redirected walking method that shifts the view of the VR world when the user turns their head, according to some embodiments.

FIG. 13 is a flowchart of a redirected walking method that shifts the view of the VR world when the user turns their head, according to some embodiments. As indicated at 1300, a user may begin using a HMD in a real environment to explore a VR world provided by a VR application of the VR system. As indicated at 1310, the VR system may analyze head motion data collected by sensors on the HMID to detect head motion (e.g., turns or rotations of the head to the left or to the right) by the user. At 1320, if head motion is detected and if the user needs to be redirected in the real world environment by rotating the VR world, then as indicated at 1330 the VR system may render and display views of the VR world, increasing the rate of rotation in the VR world (e.g., up to 2 degrees/second) as the user's head turns away from the VR path (i.e., the direction straight in front of the user), and decreasing the rate of rotation in the VR world (e.g., up to 1 degree/second) as the user's head turns back to the VR path. Note that, in some embodiments, in some cases the head motion may be slightly decreased while the head is turning away (e.g., up to 1 degrees/second) and slightly increased while the head is turning back (e.g., up to 2 degree/second). Changing the rate of rotation of the VR world as the head is rotated in the user's view of the VR world being somewhat rotated (e.g. up to 5 degrees) during the head turn, which may cause the user to compensate by reorienting themselves in the physical world to face in the correct direction in the virtual world. FIG. 5F graphically illustrates rotating the VR slightly as the user turns their head. At 1320, if head motion is not detected or if the user does not need to be redirected in the real world environment by rotating the VR world at this time, then as indicated at 1340 the VR system may render and display views of the VR world without applying the rotation described at 1330. Note, however, that one or more other redirected walking methods may be applied at 1340. As indicated by the arrow returning from element 1390 to element 1310, the VR system may continue to render and display views of the VR world, rotating the VR world slightly during head turns if necessary, as long as the user is using the virtual reality system to guide the user in the physical environment as the user is exploring the VR world.

Figure 14:
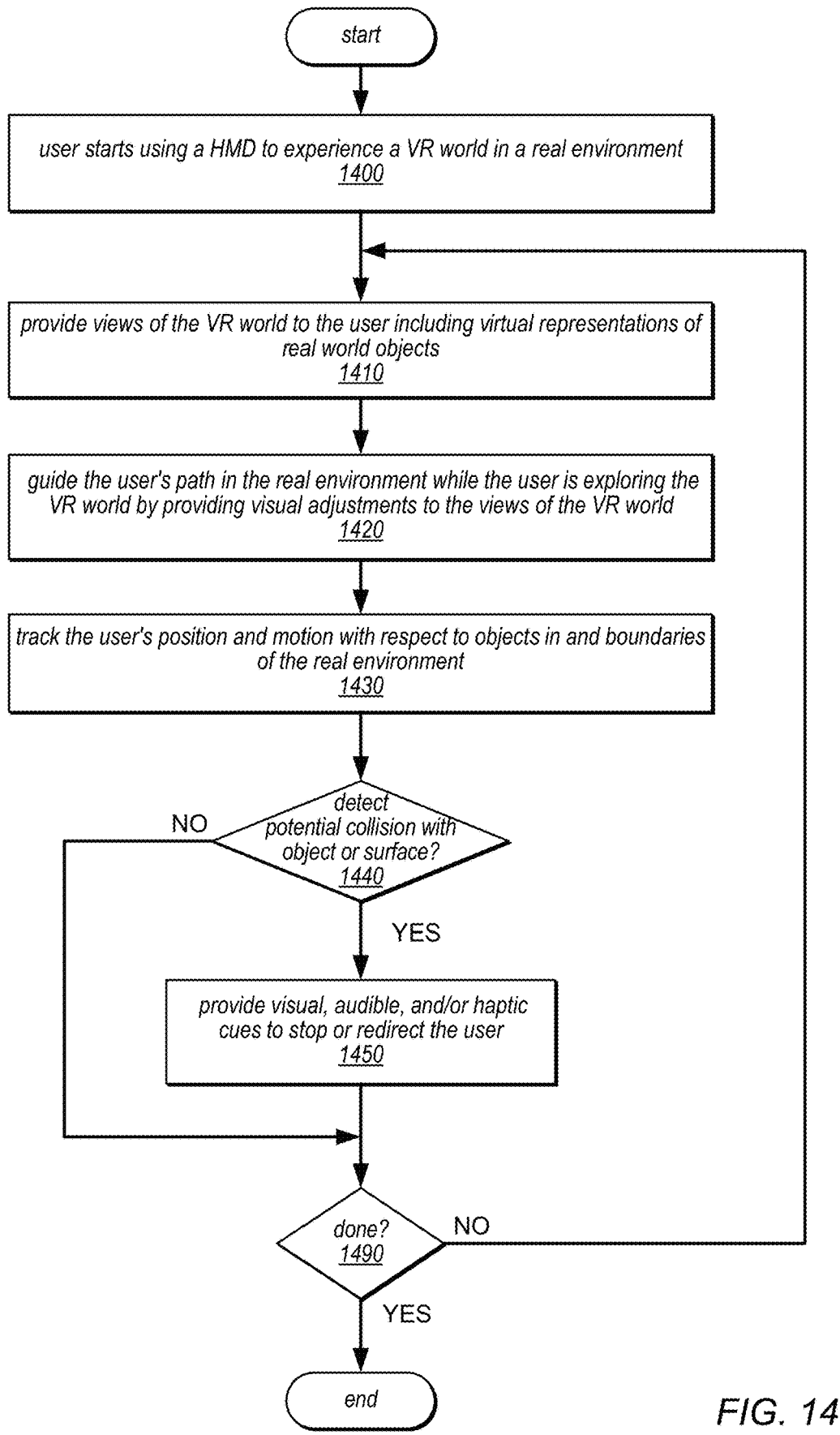
FIG. 14 is a flowchart of a method for applying redirected walking techniques to constrict a user to the boundaries of a real environment and to prevent collisions with obstacles while the user is exploring a VR world, according to some embodiments.

FIG. 14 is a flowchart of a method for applying redirected walking techniques to constrict a user to the boundaries of a real environment and to prevent collisions with obstacles while the user is exploring a VR world, according to some embodiments. As indicated at 1400, a user may begin using a HMD in a real environment to explore a VR world provided by a VR application executing on the VR system. As indicated at 1410, the VR system may render and display views of the VR world to the user as the user moves about in the real environment to explore the VR world. In some embodiments, the views may include virtual representations of physical objects in the real world environment (stationary or moving objects) and surfaces or boundaries (e.g., walls, fences, etc.), as well as virtual content of the virtual world generated by the VR application. As indicated at 1420, the VR system may apply one or more of the redirected walking methods as described herein to guide the user's path in the real environment while the user is exploring the VR world by providing visual adjustments to the views of the VR world. As indicated at 1430, the VR system may track the user's position and motion with respect to physical objects and boundaries of the real environment by analyzing data captured by world sensors of the HMD (e.g., scene cameras, depth/range sensors, IMUs, etc.). The physical objects may include stationary objects and moving objects such as other users. At 1440, if the VR system detects a potential collision with a physical object or surface in the real environment, then as indicated at 1450 the VR system may provide visual, audible, and/or haptic cues or alerts to stop or redirect the user in the physical environment. For example, if the VR system is not already displaying a virtual representation of a physical object (wall, tree, etc.) in the VR view, the VR system may display a virtual representation of the physical object as the user approaches the object, for example a wireframe representation of the object. As another example, the VR system may provide an audible alert if the user is approaching or about to collide with a physical object, and/or provide a haptic alert (e.g., vibrating a controller held by the user) if the user is approaching or about to collide with a physical object. As another example, the VR system may switch to a virtual view of the real environment by displaying a view of the real environment captured by scene cameras of the HMID instead of a view of the virtual environment if the user is about to collide with a physical object or is otherwise in danger. As indicated by the arrow returning from element 1490 to element 1410, the VR system may continue to render and display views of the VR world, guiding the user in the physical environment as the user is exploring the VR world, and analyzing sensor input to detect and react to potential collisions, as long as the user is using the virtual reality system.

Figure 15:
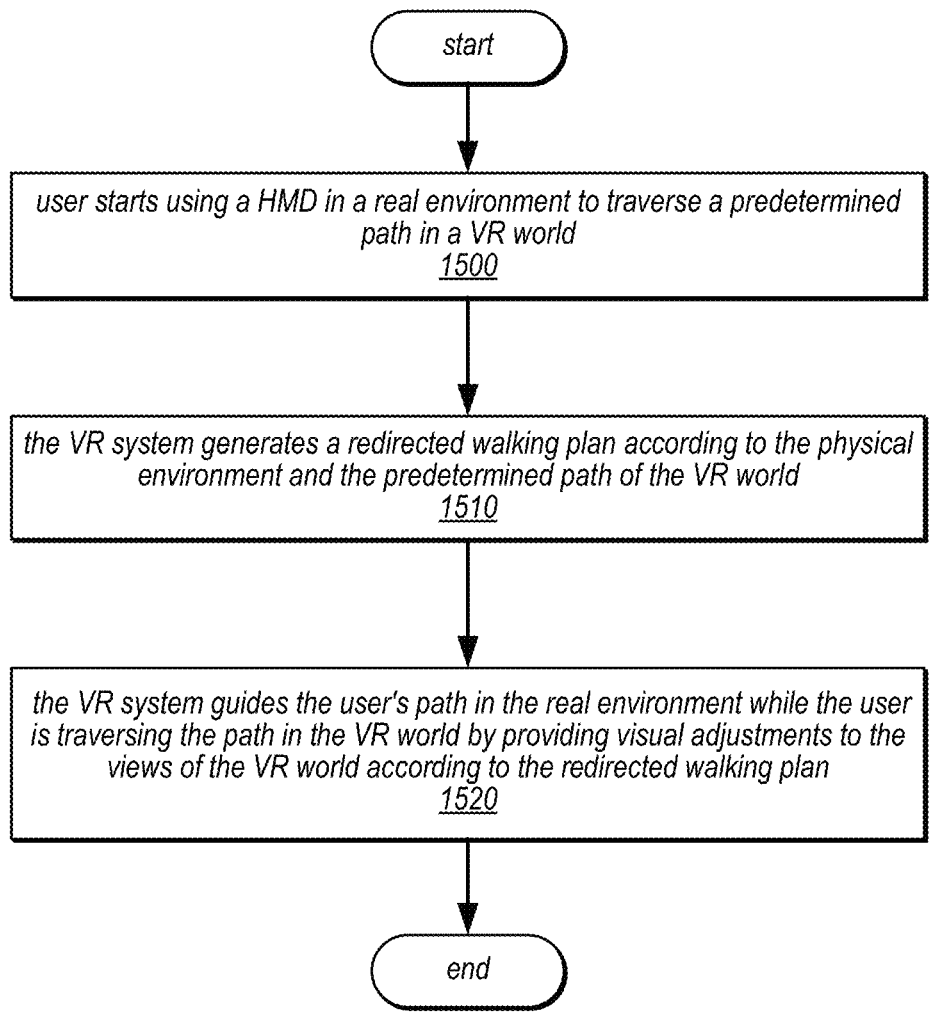
FIG. 15 is a flowchart of a method for applying redirected walking methods in a first VR scenario in which the user walks a predetermined path in a VR environment, according to some embodiments.
Figure 16:
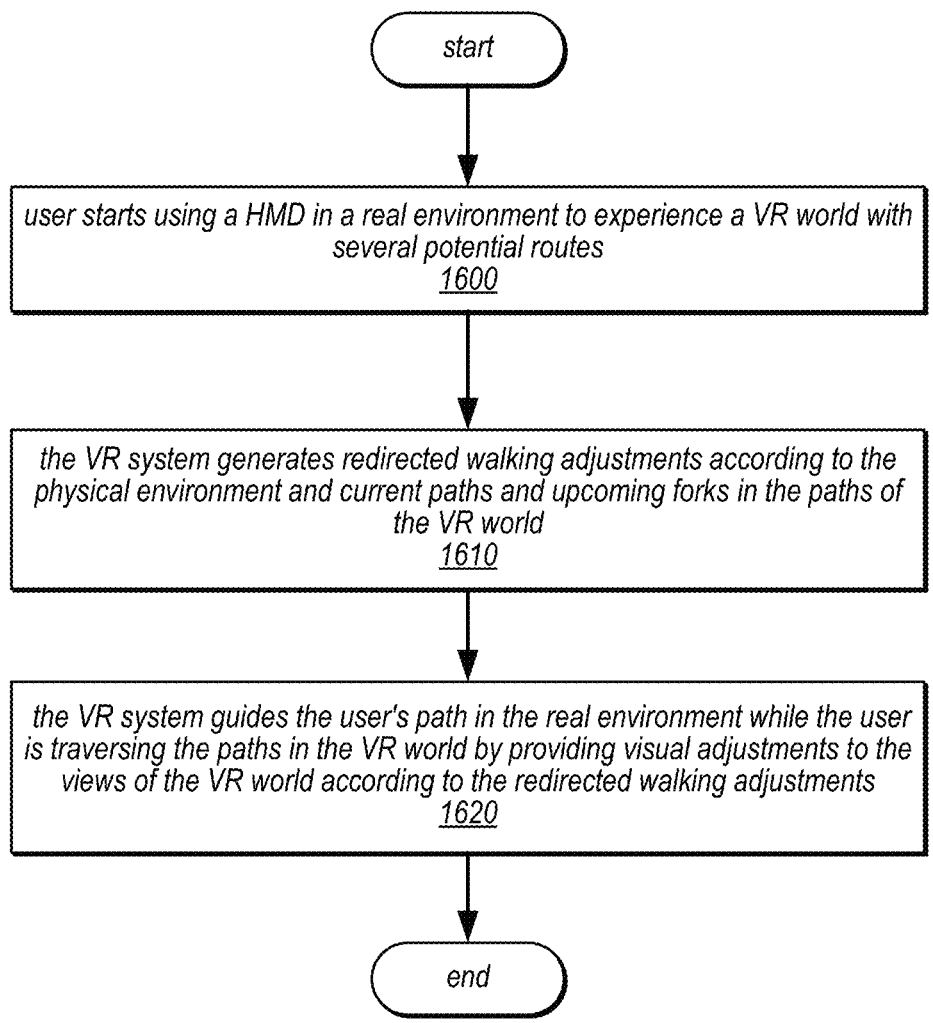
FIG. 16 is a flowchart of a method for applying redirected walking methods in a second VR scenario that provides predetermined paths with some freedom of choice, according to some embodiments.
Figure 17:
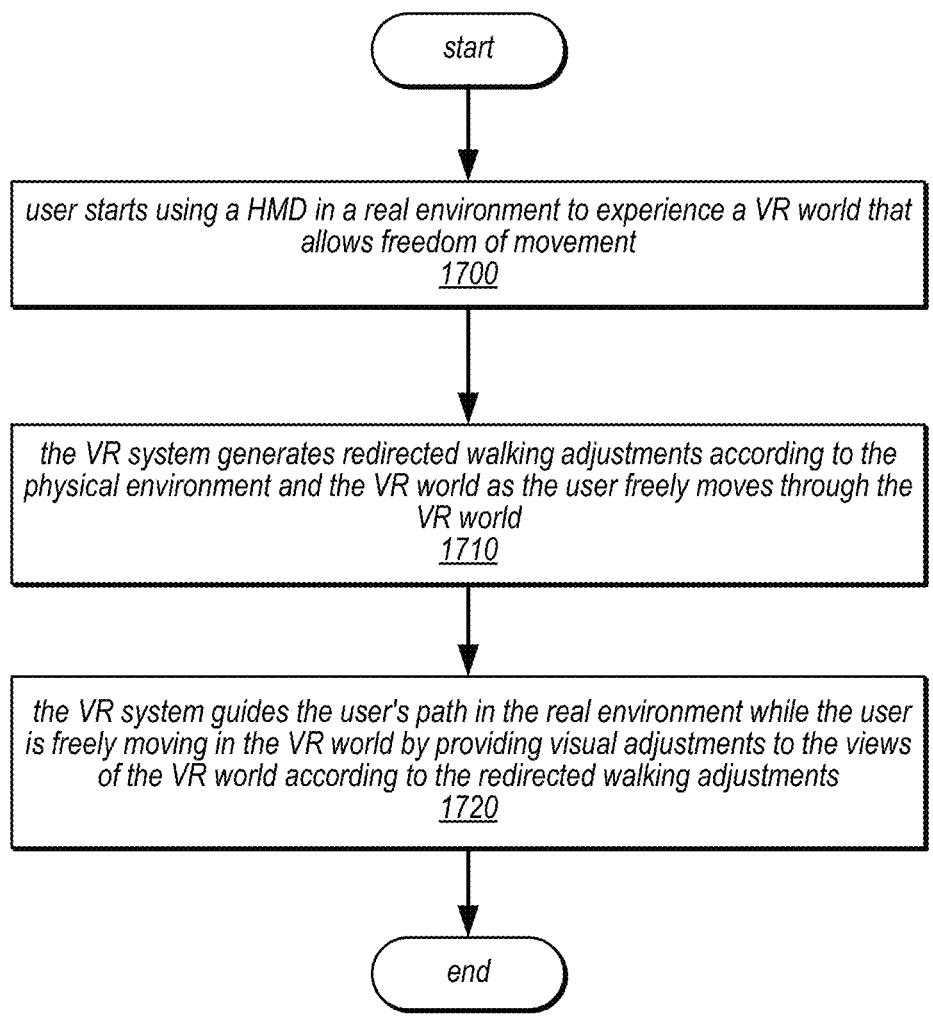
FIG. 17 is a flowchart of a method for applying redirected walking methods in a third VR scenario in which the user is free to move in any direction, according to some embodiments.

As previously noted, the redirected walking methods may be implemented in different scenarios that differ in the complexity of the paths that the user is allowed to travel in the respective VR worlds. FIGS. 15 through 17 provide high-level flowcharts of methods for applying the redirected walking methods in the different scenarios.

FIG. 15 is a flowchart of a method for applying redirected walking methods in a first VR scenario in which the user walks a predetermined path in a VR environment, for example as illustrated in FIG. 7A. In this scenario, the user follows a route through a VR environment defined by a visible path, signs, hallways, opened doors, obstacles, and so on. In this scenario, the redirected walking methods may be defined in advance according to the known turns of the route that the user may encounter and the physical layout of the physical environment. Local variations of the route may be allowed; for example, the path may split or fork around an obstacle.

As indicated at 1500, the user starts using a HMD in a real environment to traverse a predetermined path in a VR world, for example as illustrated in FIG. 7A. As indicated at 1510, the VR system generates a redirected walking plan according to the physical environment and the predetermined path of the VR world. As indicated at 1520, the VR system guides the user's path in the real environment while the user is traversing the path in the VR world by providing visual adjustments to the views of the VR world according to the redirected walking plan.

FIG. 16 is a flowchart of a method for applying redirected walking methods in a second VR scenario that provides predetermined paths with some freedom of choice, for example as illustrated in FIG. 7B. In this scenario, the user may be restricted to several routes, with occasional forks, passages, and the like that allow the user to select between different routes or paths. In this scenario, the redirected walking methods may be applied while the user is walking a route in advance of the user reaching decision points (i.e., forks in the path). The user's choices are limited to several forks, and the user's approach to these potentially problematic decision spots may be prepared in advance by guiding the user using the redirected walking methods to points in the physical space that may allow the most freedom of movement and maneuvering if the user decides to change their route (e.g., turn left or right) at these points.

As indicated at 1600, the user starts using a HMD in a real environment to experience a VR world with several potential routes, for example as illustrated in FIG. 7B. As indicated at 1610, the VR system generates redirected walking adjustments according to the physical environment and current paths and upcoming forks in the paths of the VR world. As indicated at 1620, the VR system guides the user's path in the real environment while the user is traversing the paths in the VR world by providing visual adjustments to the views of the VR world according to the redirected walking adjustments.

FIG. 17 is a flowchart of a method for applying redirected walking methods in a third VR scenario in which the user is free to move in any direction, for example as illustrated in FIG. 7C. In this scenario, there are no predefined routes for the user to follow, although there may be virtual objects that the user has to avoid or walk around, or that the user can explore. In this scenario, most or all of the redirected walking methods may be employed to guide the user's movements in the physical environment as the user explores the virtual world. For this scenario, since there are no predefined paths that the user must follow, the VR application and system may implement algorithms that determine redirected walking adjustments in real time based at least in part on world sensor information collected by the HMD to adjust the user's path in the physical environment as the user explores the virtual world.

As indicated at 1700, the user starts using a HMD in a real environment to experience a VR world that allows freedom of movement, for example as illustrated in FIG. 7C. As indicated at 1710, the VR system generates redirected walking adjustments in real time according to the physical environment and the VR world as the user freely moves through the VR world. As indicated at 1720, the VR system guides the user's path in the real environment while the user is freely moving in the VR world by providing visual adjustments to the views of the VR world according to the redirected walking adjustments. Adjusting algorithm The redirected walking methods may introduce a deliberate mismatch in the mapping of virtual space geometry to real space geometry; the mismatch may cause the user to adjust their real world path or orientation to achieve a desired virtual path or orientation. This mismatch may be algorithmically determined to optimally use the provided real space in the exploration of the virtual space. The following describes an example algorithm for introducing mismatch in the mapping of virtual space to real space geometry that may be used in some embodiments; the algorithm may be referred to as an adjusting algorithm.

In some embodiments, for each frame of the VR experience, new sensor data from the VR headset and tracking system may be collected; previously collected sensor data may be stored temporarily. From the new and previous sensor data, deltas for position and rotation can be calculated that correspond to linear and angular velocity of the user in the real world.

In some embodiments, a virtual camera is placed inside a container object that serves as a separate reference frame between virtual and real world. A rotation or translation of the container object changes the virtual camera position and rotation, and therefore the viewer's position and rotation in virtual space. Inside the container object, all relative positions (e.g., of the VR headset, controllers, etc.) may remain the same as without redirected walking.

In some embodiments, for each frame, there is an anchor point inside the tracking volume in real world coordinates, referred to as the real anchor, and an anchor point inside the virtual world in virtual world coordinates, referred to as the virtual anchor. In some embodiments, these anchors can be chosen arbitrarily. In some embodiments, the real room or space center may be used as the real anchor, and the center of a virtual room or space may be used as the virtual anchor.

In some embodiments, for each frame, vectors connecting the virtual head of the user with the virtual anchor, and vectors connecting the real head of the user with the real anchor, can be calculated. If the real and virtual anchors have the same local coordinates and the container object does not apply translation or rotation to the real anchor, the two anchors and the two head positions should match. Therefore, the vectors connecting heads to anchors and the respective rotation differences in orientation match. This means that in the current state of the VR experience, redirection may not be necessary.

In some embodiments, at any point in the VR experience, new anchors can be chosen. In some embodiments, the algorithm tries to match the real anchor's position and rotation to the virtual anchor by changing position and rotation of the container object. If, for example, the virtual anchor is placed at (1, 0, 0) and the real anchor is placed at origin (0, 0, 0), a translation of one unit on the X-axis is necessary to match the two anchors. The combination of virtual and real anchors may be selected to maximize freedom of movement in the real world with regard to the geometry of the virtual world.

In some embodiments, the virtual anchor can be moved along a predetermined path in the virtual world to maximize freedom of movement of the user along that path.

In some embodiments, the vectors connecting the real head and virtual head to the respective anchors can be compared if the real vector is rotated first using the container object's rotation. The difference between the vectors is the mismatch that is to be corrected by the redirected walking method(s). In some embodiments, for the rotation, no reorientation of real values is necessary to determine a mismatch; a simple difference suffices.

In some embodiments, rotational gain may be implemented as a fraction of the user's rotation from the last frame that is added to the container object's rotation (and therefore to the user's rotation in the scene). In some embodiments, to introduce as little eye translation as possible, the container object is not rotated around its center, but around the head position inside the container object. If the head position and container object center do not match, this introduces additional translation of the container object (but not to the head in the scene), which has to be corrected.

In some embodiments, translational gain may be implemented as a fraction of the user's translation from the last frame that is added to the container object's position. This translation has a direction that can be compared to the direction in which the container object needs to be translated, for example using a dot product of the two normalized vectors. Multiplying the result with a fraction of the user's translation results in faster or slower movement in virtual space depending on the degree to which the user's movement in the current frame can be used to shift the virtual anchor closer to alignment with the real anchor.

In some embodiments, one or both rotational and translational gain may be smoothed by logistic multipliers to reduce redirection jitter when the target is almost reached and speeds are low.

In some embodiments, in addition to the gain methods, the user can be slightly rotated and shifted without any active movement. For that purpose, the container object is translated and rotated with a fraction of the desired total change, which results in a constant and imperceptible change in orientation and position for the user in the scene until the virtual and real anchors match.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
   initiating a head-mounted display (HMD) to display views in a virtual reality (VR) environment along a predetermined path in the VR environment that includes one or more forks;
   capturing, using one or more range sensors of the HMD, range information about a physical environment;
   determining, using the range information captured by the one or more range sensors, a moving object in the physical environment and a location and velocity of the moving object in the physical environment with respect to the HMD;
   generating a redirected walking plan for movement of the HMD in the physical environment while following the predetermined path in the VR environment, wherein the redirected walking plan is generated based at least in part on at least one upcoming fork in the predetermined path and the location and velocity of the moving object in the physical environment; and
   providing visual adjustments to the VR environment according to the redirected walking plan in the physical environment while traversing the predetermined path in the VR environment.

2. The method of claim 1, further comprising:
   detecting one or more obstacles in the physical environment, wherein the redirected walking plan is generated based on avoiding the one or more obstacles in the physical environment.

3. The method of claim 1, further comprising:
   detecting one or more boundaries of the physical environment, wherein the redirected walking plan is generated based on avoiding the one or more boundaries of the physical environment.

4. The method of claim 1, further comprising:
   receiving sensor data for the HMD;
   determining a position and motion of the HMD in the real environment based on the sensor data; and
   rendering the views of the VR environment based on the position and motion of the HMD.

5. The method of claim 4, wherein providing the visual adjustments to the VR environment comprises:
   rotating the VR environment with respect to the position of the HMD by shifting the views left or right at a rate of rotation that is different from a rotation in the motion of the HMD.

6. The method of claim 4, wherein providing the visual adjustments to the VR environment comprises:
   rotating the VR environment with respect to the position of the HMD by shifting the views left or right while moving straight along the predetermined path in the VR environment.

7. The method of claim 1, further comprising:
   analyzing eye tracking data for an eye of a user of the HMD; and
   detecting a blink of the eye according to the eye tracking data, wherein the visual adjustments to the VR environment are provided during the blink.

8. A system, comprising:
   a head-mounted display (HMD) configured to display views in a virtual reality (VR) environment along a predetermined path in the VR environment that includes one or more forks;
one or more range sensors of the HMD configured to capture range information about a physical environment;
one or more processors; and
a memory storing instructions that, when executed on or across the one or more processors, cause the one or more processors to:
  determine, using the range information captured by the one or more range sensors, a moving object in the physical environment and a location and velocity of the moving object in the physical environment;
  generate a redirected walking plan for movement of the HMD in the physical environment while following the predetermined path in the VR environment, wherein the redirected walking plan is generated based at least in part on at least one upcoming fork in the predetermined path and the location and velocity of the moving object in the physical environment with respect to the HMD; and
  provide visual adjustments to the VR environment according to the redirected walking plan in the physical environment while traversing the predetermined path in the VR environment.

9. The system of claim 8, wherein the memory further comprises instructions that, when executed on or across the one or more processors, cause the one or more processors to:
  detect one or more obstacles in the physical environment, wherein the redirected walking plan is generated based on avoiding the one or more obstacles in the physical environment.

10. The system of claim 8, wherein the memory further comprises instructions that, when executed on or across the one or more processors, cause the one or more processors to:
  detect one or more boundaries of the physical environment, wherein the redirected walking plan is generated based on avoiding the one or more boundaries of the physical environment.

11. The system of claim 8, wherein the memory further comprises instructions that, when executed on or across the one or more processors, cause the one or more processors to:
  receive sensor data for the HMD;
  determine a position and motion of the HMD in the real environment based on the sensor data; and
  render the views of the VR environment based on the position and motion of the HMD.

12. The system of claim 11, wherein to provide the visual adjustments to the VR environment, the memory further comprises instructions that, when executed on or across the one or more processors, cause the one or more processors to:
  rotate the VR environment with respect to the position of the HMD by shifting the views left or right at a rate of rotation that is different from a rotation in the motion of the HMD.

13. The system of claim 11, wherein to provide the visual adjustments to the VR environment, the memory further comprises instructions that, when executed on or across the one or more processors, cause the one or more processors to:
  rotate the VR environment with respect to the position of the HMD by shifting the views left or right while moving straight along the predetermined path in the VR environment.

14. The system of claim 8, wherein the memory further comprises instructions that, when executed on or across the one or more processors, cause the one or more processors to:
  analyze eye tracking data for an eye of a user of the HMD; and
  detect a blink of the eye according to the eye tracking data, wherein the visual adjustments to the VR environment are provided during the blink.

15. One or more non-transitory, computer-readable storage media storing instructions that, when executed on or across one or more processors, cause the one or more processors to:
  initiate a head-mounted display (HMD) to display views in a virtual reality (VR) environment along a predetermined path in the VR environment that includes one or more forks;
  receive range information about a physical environment captured by one or more range sensors of the HMD;
  determine, using the range information captured by the one or more range sensors, a moving object in the physical environment and a location and velocity of the moving object in the physical environment;
  generate a redirected walking plan for movement of the HMD in physical environment while following the predetermined path in the VR environment, wherein the redirected walking plan is generated based at least in part on at least one upcoming fork in the predetermined path and the location and velocity of the moving object in the physical environment with respect to the HMD; and
  provide visual adjustments to the VR environment according to the redirected walking plan in the physical environment while traversing the predetermined path in the VR environment.

16. The one or more non-transitory, computer-readable storage media of claim 15, further comprising instructions that, when executed on or across the one or more processors, cause the one or more processors to:
  determine that the one or more instances of content on an object include a local speed limit;
  based on a determination that environmental conditions include rain, include, in a display element, an instance of generated content that is based at least on an adjusted value of the local speed limit.

17. The one or more non-transitory, computer-readable storage media of claim 16, further comprising instructions that, when executed on or across the one or more processors, cause the one or more processors to:
  detect one or more obstacles in the physical environment, wherein the redirected walking plan is generated based on avoiding the one or more obstacles in the physical environment.

18. The one or more non-transitory, computer-readable storage media of claim 16, further comprising instructions that, when executed on or across the one or more processors, cause the one or more processors to:
  detect one or more boundaries of the physical environment, wherein the redirected walking plan is generated based on avoiding the one or more boundaries of the physical environment.

19. The one or more non-transitory, computer-readable storage media of claim 16, further comprising instructions that, when executed on or across the one or more processors, cause the one or more processors to:
  receive sensor data for the HMD;
  determine a position and motion of the HMD in the real environment based on the sensor data; and
  render the views of the VR environment based on the position and motion of the HMD.

20. The system of claim 19, wherein to provide the visual adjustments to the VR environment, the instructions when executed on or across the one or more processors, cause the one or more processors to:
- rotate the VR environment with respect to the position of the HMD by shifting the views left or right at a rate of rotation that is different from a rotation in the motion of the HMD; or
- rotate the VR environment with respect to the position of the HMD by shifting the views left or right while moving straight along the predetermined path in the VR environment.

* * * * *